United States Patent

Dunworth et al.

[19]

[11] Patent Number: 5,930,474
[45] Date of Patent: Jul. 27, 1999

[54] INTERNET ORGANIZER FOR ACCESSING GEOGRAPHICALLY AND TOPICALLY BASED INFORMATION

[75] Inventors: Peter D. Dunworth, Huntington Beach; John W. Veenstra; Joan Nagelkirk, both of Balboa Island, all of Calif.

[73] Assignee: Z Land LLC, Santa Ana, Calif.

[21] Appl. No.: 08/595,026

[22] Filed: Jan. 31, 1996

[51] Int. Cl.⁶ .................................................. G06F 17/30
[52] U.S. Cl. ........................................ 395/200.47; 707/10
[58] Field of Search .......................... 395/200.47, 200.48, 395/200.49; 707/4, 10, 103, 501

[56] References Cited

PUBLICATIONS author unknown, Yahoo! Company History, www.yahoo.com/info/misc/history.html, p. 1, Dec. 1994.
Mark Brown et al., Special Edition Using Netscape 2, pp. 182–207, Jan. 1995.
Yahoo Regional category, directory pages, pp. 1–3, Dec. 1994.
Newsbytes, Open Text Teams with Yahoo!, Newsbytes Inc., (Full text), Sep. 1995.
Dennis S. Arnon et al., Using Structured Documents for Implementing Product/Service Yellow Pages Architecture on the Internet, pp. 312–321, Dec. 1994.
Internet release announcing new "Get Local" service, http://www.yahoo.com.docs/pr/release57.html. Aug. 26, 1996.
Noglows, et al., "Coming Soon to a Town Near You: The LocalNet", Hambrecht & Quist LLC Institutional Research, vol. 1, Issue 1, Nov. 1996.
Weintraut, et al., "The Internet: Webbing The Information Economy", Hambrecht & Quist LLC Institutional Research, Sep. 22, 1995.
Screenshot of Home page for online yellow pages located at Internet address: WWW.bigbook.COM (6 pages), Jan. 1996.

*Primary Examiner*—Zarni Maung
*Assistant Examiner*—Patrice L. Winder
*Attorney, Agent, or Firm*—Knobbe, Martens, Olson & Bear LLP

[57] ABSTRACT

A software interface organizes information predicated upon the geographical area of the resources about which the information is desired. A user is presented with a "viewpoint" map which may comprise, for example, an actual visually displayed map of a selected geographical area, or text information which pertains to the resources associated with the selected geographical area. A geography database, a local content database and a yellow pages database are provided to allow the user to obtain information at different levels. The geography database allows the user to browse through different geographic areas of which are ordered hierarchically, while the local content database includes information about general goods and services available within a given geographic location and the yellow pages database includes information about specific goods and services in the geographic location. Thus, the user is provided with a means whereby information which is associated with particular geographic locations can be readily accessed.

39 Claims, 22 Drawing Sheets

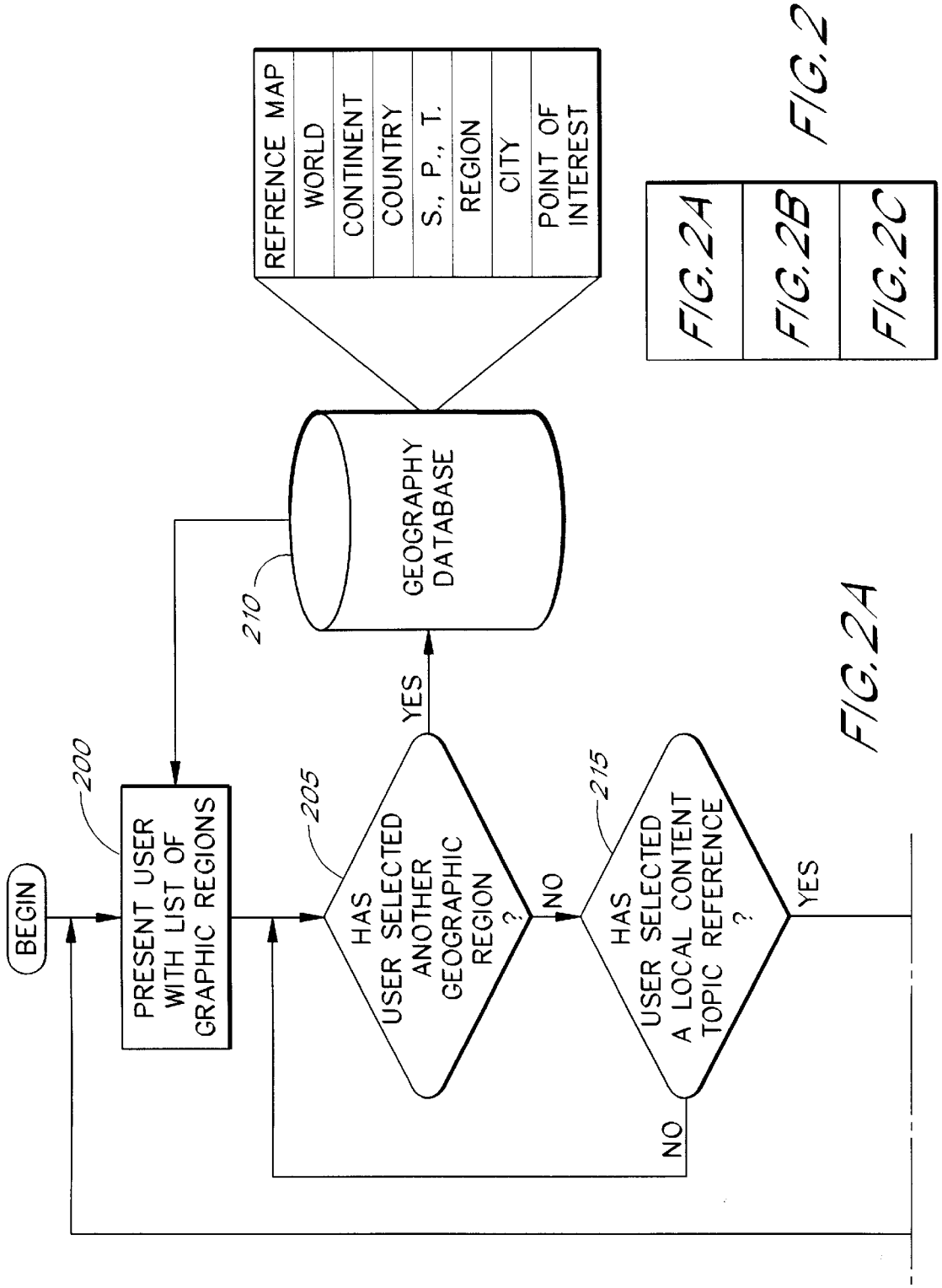

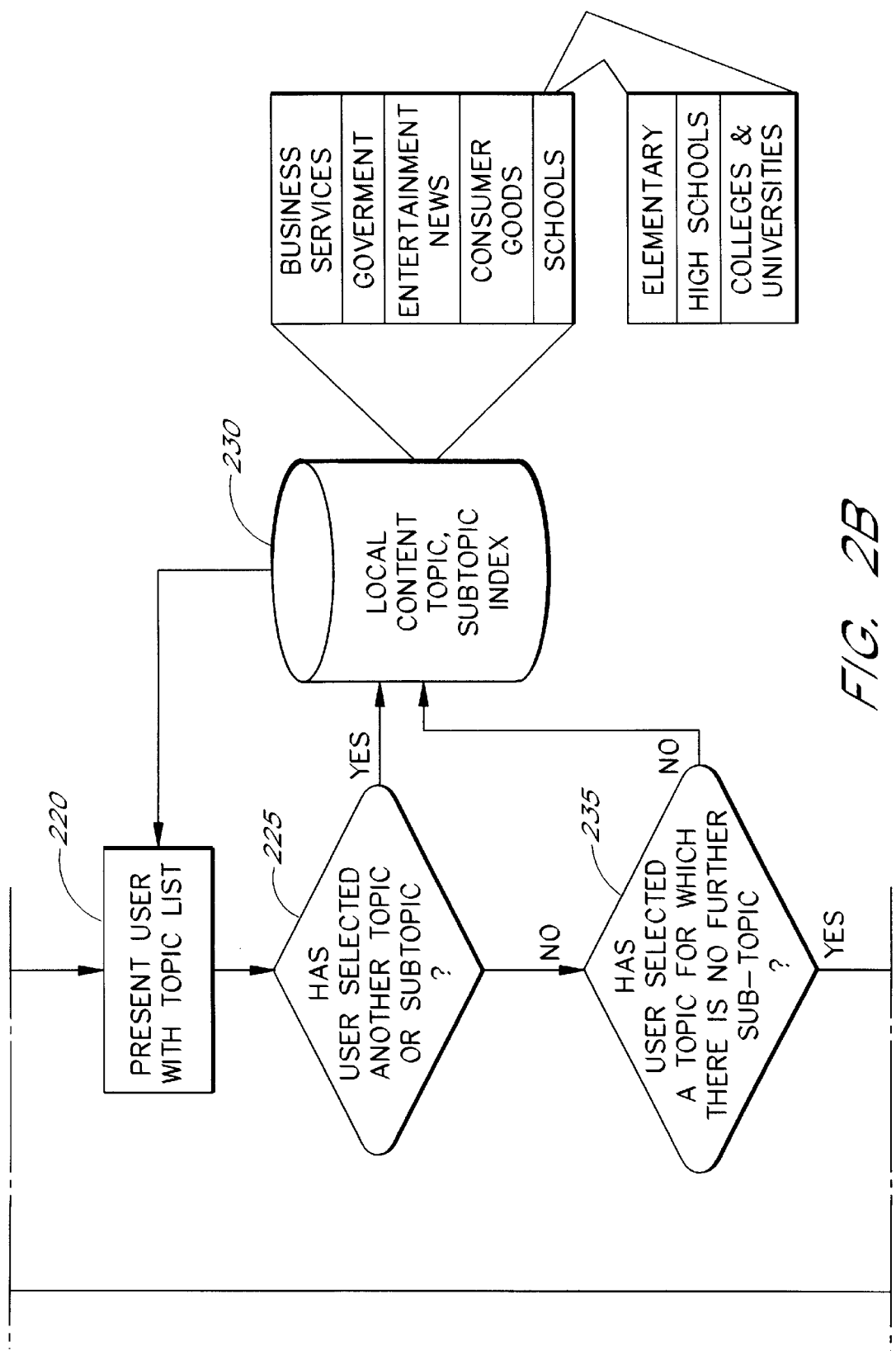

City of Los Angeles, Ca.
Folders

Our Town (27 of 27)

- ⬤ Amusement Parks
- ⬤ Beaches & Hoarbors
- ⬤ Calendar
- ⬤ Chamber of Commerce
- ⬤ City Government
- ⬤ Clubs & Organizations
- ⬤ Convention Center
- ⬤ Directories
- ⬤ Emergency Services
- ⬤ Golf Courses
- ⬤ Hospitals & Clinics
- ⬤ Hotels & Motels
- ⬤ Kid's Interest
- ⬤ Museums
- ⬤ Neighborhood Watch
- ⬤ Opinion & Editorials
- ⬤ Points of Interest
- ⬤ Post Office
- ⬤ Religion
- ⬤ School Listing
- ⬤ Shopping Malls
- ⬤ Sports Teams
- ⬤ Stadiums
- ⬤ Theatres
- ⬤ Tourist Bureaus
- ⬤ Transportation
- ⬤ Utilities

*FIG. 10*

 

Send your letters and comments to: webeditor@mail.zland.com
Copyright © 1995 Z Land, LLC. All rights reserved.

Martin Luther King Jr. General

Martin Luther King Jr. General
12021 S Wilmington Ave.
Los Angeles, Ca.

Phone: 310-668-4321 Fax:

Electronic Mail Address:

Send your letters and comments to: webeditor@mail.zland.com

Copyright © 1995 Z Land, LLC. All rights reserved.

North American Database1
Continents of
 Continents of Earth (7 of 7)
● Africa
● Antartica
● Asia
● Australia
● Europe
● North America
● South America
 
---
Send your letters and comments to: webeditor@mail.zland.com
Copyright © 1995 Z Land, LLC. All rights reserved.
FIG. 12

North American Database1 ⟵ 1505
CITY

Welcome to Los Angeles 1515

Wheather you're4 here to live, work or play, we hope your stay in our city is prosperous and enjoyable
Our city is really many smaller communities that share diverse culture and lifestyles. 1520

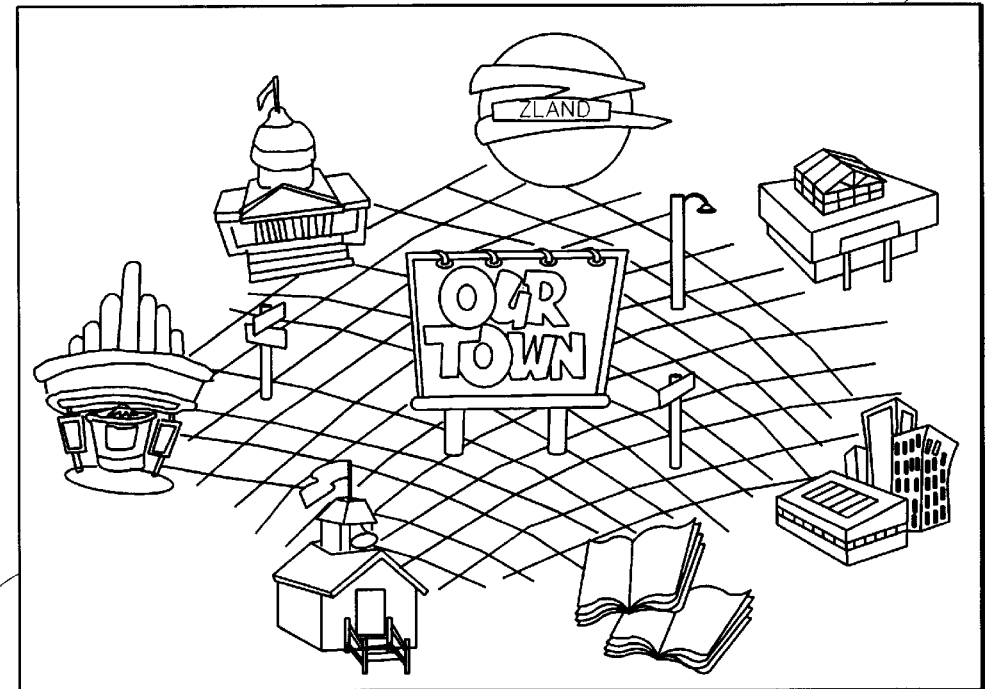

1528  1530  1525

 Los Angeles
1535 — Points of Interest for Los Angeles
Southern California
1540 — California
United States
North America

1550

 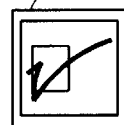

Send your letters and comments to: webeditor@mail.zland.com
1560
Copyright © 1995 Z Land, LLC. All rights reserved.

*FIG. 15*

| Field | ID |
|---|---|
| EXPIRE DATE | 1700 |
| NAME | 1705 |
| ADDRESS | 1710 |
| CITY | 1715 |
| STATE | 1720 |
| ZIP CODE | 1725 |
| PHONE | 1730 |
| FAX | 1735 |
| SKELETON HTML | 1740 |
| E-MAIL | 1745 |
| BULLET | 1750 |
| URL | 1755 |
| BUTTON COUNT | 1760 |
| LABEL URLx | 1765 |
| LISTING URLx | 1770 |
| IMAGE URLx | 1775 |
| SIC CODE | 1780 |
| KEYWORDS | 1785 |
| EXT. PRICE | 1790 |
| DESCRIPTION | 1795 |

FIG. 17

Los Angeles Directory
KeywordListing

Hospitals & Health Services (18 of 18)

○ Health Services Depatment 800-427-8700
Admin. Office-313 N Figueroa Los Angeles ○ General Hospital 213-226-2622
1200 N State Los Angeles ○ Womens Hospital 213-226-2622
1240 N Mission Rd Los Angeles ○ Martin Luther King Jr. General 310-668-4321
12021 S Wilmington Ave. Los Angeles ○ Health Services Information 213-250-8055 Los Angeles ○ Children's Hospital 213-226-2622
1129 N State Los Angeles ○ University Of Southern California Medical Center 213-226-2622
1200 N State Los Angeles ○ Mental Health Services 213-738-4961
2415 W-6th Los Angeles ○ Medical Board Of California 800-633-2322

○ V A Hospital 310-478-3711
Wilshire Blv. & Sawtelle Blv. West Los Angeles

○ East Los Angeles Neighborhood Clinic 213-725-7557
5400 Olympic Blv. Los Angeles

 

Send your letters and comments to: webeditor@mail.zland.com

Copyright © 1995 Z Land, LLC. All rights reserved.

FIG. 18

INTERNET ORGANIZER FOR ACCESSING GEOGRAPHICALLY AND TOPICALLY BASED INFORMATION

BACKGROUND OF THE INVENTION

1. Field of the Invention

The present invention relates to network interfaces which act to organize information accessible on the network and, in particular, to an Internet browser interface which acts to organize information available on the Internet based upon geographical distribution.

2. Description of the Related Art

On-line computer services, such as the Internet, have grown immensely in popularity over the last decade. Typically, such an on-line computer service provides access to a hierarchically structured database where information within the database is accessible at a plurality of computer servers which are in communication via conventional telephone lines or T1 links, and a network backbone. For example, the Internet is a giant internetwork created originally by linking various research and defense networks (such as NSFnet, MILnet, and CREN). Since the origin of the Internet, various other private and public networks have become attached to the Internet.

The structure of the Internet is a network backbone with networks branching off of the backbone. These branches, in turn, have networks branching off of them, and so on. Routers move information packets between network levels, and then from network to network, until the packet reaches the neighborhood of its destination. From the destination, the destination network's host directs the information packet to the appropriate terminal, or node. For a more detailed description of the structure and operation of the Internet, please refer to "The Internet Complete Reference," by Harley Hahn and Rick Stout, published by McGraw-Hill, 1994.

A user may access the Internet, for example, using a home personal computer (PC) equipped with a conventional modem. Special interface software is installed within the PC so that when the user wishes to access the Internet, a modem within the user's PC is automatically instructed to dial the telephone number associated with the local Internet host server. The user can then access information at any address accessible over the Internet. One well-known software interface, for example, is the NETSCAPE Browser (a species of HTTP Browser), developed by Netscape, Inc.

Information exchanged over the Internet is often encoded in HyperText Mark-up Language (HTML) format. HTML encoding is a kind of script encoding language which is used to define document content information and other sites on the Internet. As is well known in the art, HTML is a set of conventions for marking portions of a document so that, when accessed by a parser, each portion appears with a distinctive format. The HTML indicates, or "tags," what portion of the document the text corresponds to (e.g., the title, header, body text, etc.), and the parser actually formats the document in the specified manner. An HTML document sometimes includes hyper-links which allow a user to move from document to document on the internet. A hyper-link is an underlined or otherwise emphasized portion of text or graphical image which, when clicked using a mouse, activates a software connection module which allows the users to jump between documents (i.e., within the same Internet site (address) or at other Internet sites). Hyper-links are well known in the art.

One popular computer on-line service is the Worldwide Web (WWW) which constitutes a subnetwork of on-line documents within the Internet. The WWW includes graphics files in addition to text files and other information which can be accessed using a network browser which serves as a graphical interface between the on-line WWW documents and the user. One such popular browser is the MOSAIC web browser (developed by the National Super Computer Agency (NCSA)). A web browser is a software interface which serves as a text and/or graphics link between the user's terminal and the Internet networked documents. Thus, a web browser allows the user to "visit" multiple web sites on the Internet.

Typically, a web site is defined by an Internet address which has an associated home page. Generally, multiple subdirectories can be accessed from a home page. While in a given home page, a user is typically given access only to subdirectories within the home page site; however, hyper-links allow a user to access other home pages, or subdirectories of other home pages, while remaining linked to the current home page in which the user is browsing.

Although the Internet, together with other on-line computer services, has been used widely as a means of sharing information amongst a plurality of users, current Internet browsers and other interfaces have suffered from a number of shortcomings. For example, the organization of information accessible through current Internet browsers and organizers such as NETSCAPE or MOSAIC, may not be suitable for a number of desirable applications. In certain instances, a user may desire to access information predicated upon geographic areas as opposed to by subject matter or keyword searches. In addition, present Internet organizers do not effectively integrate the topical and geographically based information in a consistent manner.

In addition, given the large volume of information available over the Internet, current systems may not be flexible enough to provide for organization and display of each of the kinds of information available over the Internet in a manner which is appropriate for the amount and kind of data to be displayed.

SUMMARY OF THE INVENTION

A user interface organizes information into a consistent presentation of menu selections and geographically organized information. Furthermore, at specified levels of the geographically organized information, the user is presented with the option of accessing topically organized information from among several topic selections, wherein the topical information is defined by the fact that the topical information is associated with a particular geographical area. Thus, a system and method for integrating geographically organized information with topical information is provided by the teachings of the present invention. The user interacts with the web organizer by choosing among menu selections using standard point-and-click techniques. The web organizer of the preferred embodiment translates the user's current menu selections into either a set of search engine queries that provide further menu selections, or a set of web destinations that satisfy the user's search criteria.

Furthermore, the inventors have recognized the need for a system which dynamically generates display documents in order to accommodate the various kinds of information and information formats which may be found on the Internet.

According to one preferred embodiment, the invention comprises a system which associates on-line information with geographic areas. The system comprises a computer network wherein a plurality of computers have access to the computer network and an organizer executing in the computer network. The organizer is configured to receive search requests from any one of the plurality of computers. The organizer comprises a database of information organized into a hierarchy of geographical areas. The information corresponding to each one of the hierarchy of geographical areas is further organized into topics. The organizer further comprises a search engine in communication with the database. The search engine is configured to search geographically and topically. The search engine is further configured to select one of the hierarchy of geographical areas prior to selection of a topic so as to provide a geographical search area containing topical information. Finally, the search engine is configured to search the topics within the selected geographical search area.

According to one preferred embodiment, the hierarchy of geographical areas define a virtual geographical environment.

According to another preferred embodiment, the hierarchy has a structure comprising plural geographical levels into which the geographical areas are geographically categorized by size to provide a low level, one or more intermediate levels and a high level. Each of the geographical levels above the lowest level encompasses a plurality of lower level geographical areas.

According to yet a further preferred embodiment, for any given geographical search area, the plurality of topics corresponding to the geographical search area are primarily related by association with physical attributes within the geographical search area.

Under another aspect, the invention comprises a system for composing the display format of remotely accessible information in an on-line network. The system comprises at least one user computer. The user computer is configured to display remotely accessible information. The system further comprises a database which stores the remotely accessible information and a plurality of display formats. The remotely accessible information is organized into a predefined geographical hierarchy of geographical areas. Finally, the system comprises a display page composer in communication with the database and the user computer. The display page composer is configured to merge a portion of the remotely accessible information with one of the display formats to generate a display page which is communicated to the user computer.

According to a further aspect, the invention comprises a machine for locating information organized into geographically-based areas. The machine comprises a database of information accessible by a computer. The database of information is organized into a predetermined hierarchy of geographical areas comprising at least a geographical area of relatively small expanse, a geographical area of intermediate expanse and a geographical area of relatively large expanse. The area of large expanse includes a plurality of areas of intermediate expanse, and the area of intermediate expanse includes a plurality of areas of small expanse. The information corresponding to each of the hierarchy of geographical areas is further organized into topics. The machine further comprises a search engine executing in a computer and in communication with the database. The search engine is configured to select at least one geographical area in the hierarchy of geographical areas so as to define a geographical search area having a predetermined geographical boundary. The search engine is further configured to search the topics within the geographical search area.

Under yet another aspect, the invention is a system for organizing on-line information into geographically-based areas. The system comprises a user computer for accessing information in a computer network; and organizer means for processing requests received from the user computer. The organizer comprises a database of information organized into a predefined hierarchy of geographical areas. The information corresponding to each of the geographical areas is further organized into topics. The organizer further comprises a search engine means for selecting one of the geographical areas prior to the selection of a topic so as to define a geographical search area. The search engine means also comprises means for searching the topics associated with the geographical search area.

Under a further aspect, the invention is a method for locating on-line information comprising the steps of: organizing a database of on-line information into a plurality of geographical areas; organizing the information corresponding to the plurality of geographical areas into one or more topics; directing a search engine executing in a computer to select one or more of the geographical areas prior to selecting a topic so as to select a geographical search area containing less than all topical information in the database on the selected topic; and displaying the topics associated with the geographical search area.

According to a still further aspect, the invention is a method of composing the display format of information stored in an on-line database. The method comprises the steps of: providing a computer accessible database which stores on-line information and a plurality of display formats wherein the on-line information is organized into a predefined hierarchy of geographical areas; generating a search request with a computer; processing the search request with a search engine to define a geographical search area containing one or more of the geographical areas; searching the geographical search area to retrieve the display format associated with the geographical search area; and merging a portion of the on-line information associated with the selected geographical search area with the retrieved display format to generate a display page containing the portion of the on-line information.

BRIEF DESCRIPTION OF THE DRAWINGS

FIGS. 2, 2A–2C depict an overall system flow diagram that illustrates the sequence of data access a user follows to access information in accordance with the preferred embodiment.

FIG. 10 is an exemplary display which illustrates the local content list presented to the user when the user accesses a list of topics within the selected geographic area.

FIG. 12 is an exemplary screen display which is presented to the user when the user accesses information contained within the geographic database.

FIG. 15 is an exemplary screen display which is presented to the user when the user has entered a particular city or area for which local topics are able to be accessed.

FIG. 17 is a schematic diagram which illustrates the format of data stored within the yellow pages database.

FIG. 18 is an exemplary screen display which is presented to the user when the user accesses final destination information within the yellow pages database.

DETAILED DESCRIPTION OF THE PREFERRED EMBODIMENT

As will be described in detail below with respect to the Figures, a preferred embodiment of the invention includes a user interface which organizes information into a consistent presentation of menu selections and geographically organized information. Furthermore, at specified levels of the geographically organized information, the user is presented with the option of accessing topically organized information from among several topic selections, wherein the topical information is customized for each geographic area to reflect topics indigenous to that area. Thus, each of the lists is primarily related by association with physical attributes within a particular geographic area. That is, although the topic selections associated with a particular geographical area may be related by chance (e.g., a particular chain of restaurants may be owned by the same company as another chain of bakeries) the essential reason for grouping the topics together is that they are associated with the same geographic area. Thus, such a system is distinguished from systems which have geographically differentiated listings for the same topic (such as job search databases which include information about jobs in different cities), since these listings are primarily related to the topic (e.g., jobs), not to the geographical area.

Figure 1:
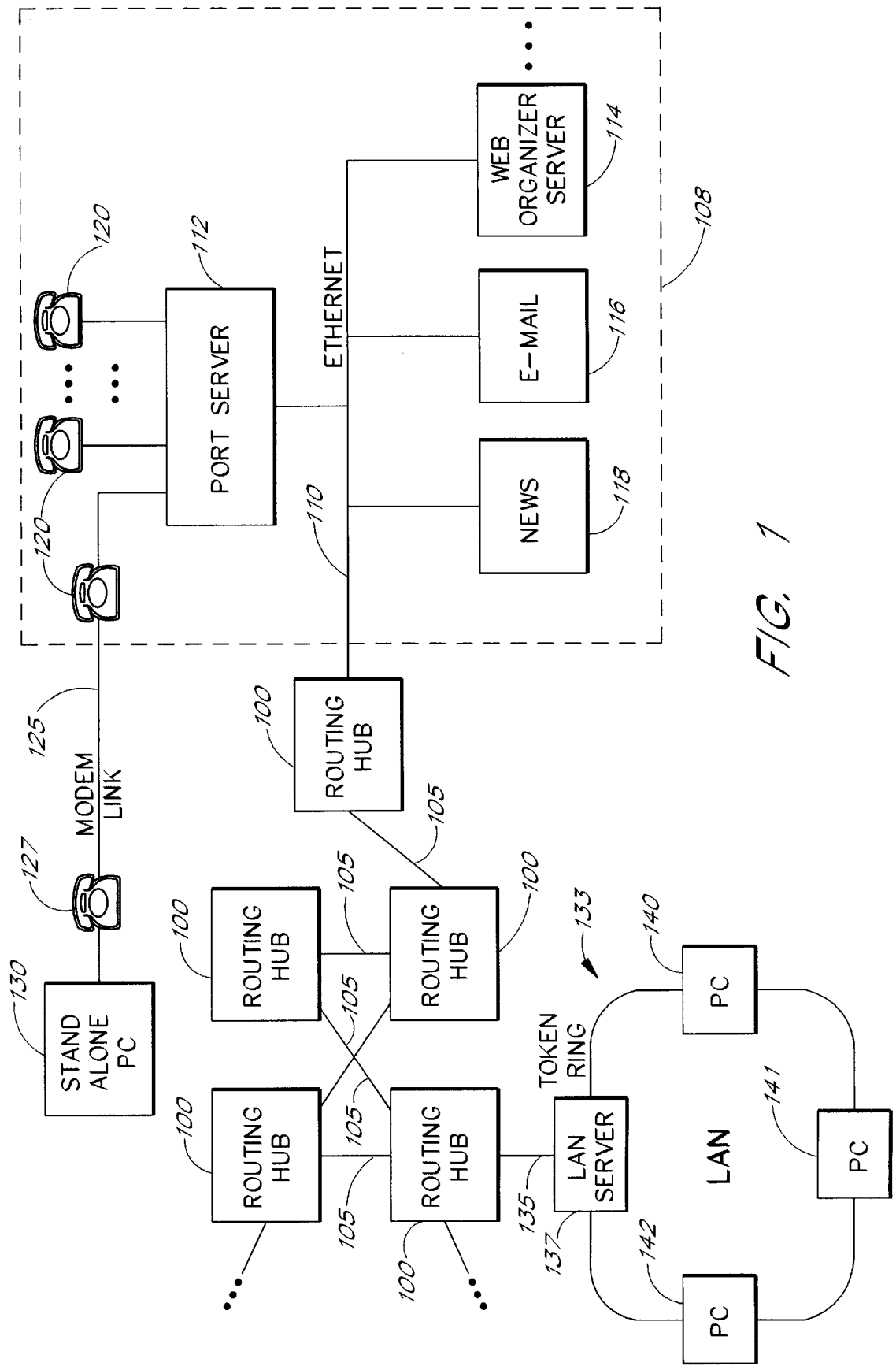
FIG. 1 is a simplified schematic block diagram that shows the general structure of a computer on-line Internet work service such as the Internet.

FIG. 1 is a simplified schematic block diagram which illustrates the general structure of an on-line computer service such as the Internet. As is well understood to those of skill in the art, the Internet comprises a plurality of geographically distributed servers, interconnected by a high-speed data backbone. For example, as illustrated in FIG. 1, a plurality of routing hubs 100 interconnect via a plurality of high-speed data transfer connections 105. In one advantageous embodiment, the routing hubs 100 comprise domain name system (DNS) servers, as is well known in the art. DNS is a transfer control protocol/Internet protocol (TCP/IP) service that is called upon to translate domain names to and from Internet protocol (IP) addresses. The routing hubs 100 connect to one or more of the other routing hubs 100 via high-speed data links such as T1 links, T3 links, ATM links, etc.

The routing hubs 100 typically connect to Internet access providers (sometimes referred to as service providers) which serve as an interface between stand-alone personal computer (PC) users and the high-speed backbone of the Internet. An Internet access provider is a company or organization which provides Internet access to the public. For example, one Internet access provider is Z-LAND LLC, located in Santa Ana, Calif. As depicted in FIG. 1, an Internet service provider 108 connects to one of the routing hubs 100 via an Ethernet link 110. The ethernet link 110 communicates with a port server 112, a web organizer server 114, an E-mail server 116, a news server 118, as well as other servers (not shown in FIG. 1), as called for by the particular application. The port server 112 communicates with a plurality of modems 120 wherein one or more of the modems 120 communicates with a stand-alone PC 130 via a modem 127 and a modem link 125.

One or more of the routing hubs 100 may also connect to a local area network (LAN), such as a LAN 133 via a high-speed link 135. It should be understood that the LAN 133 may also connect to the routing hub 100 via a conventional telephone line; however, since local area networks typically have a higher volume of data traffic, it is advantageous to include a high data rate connection such as the T1 link 135 to support the volume of information which the LAN 133 will transfer to and from the Internet routing hubs 100. As depicted in FIG. 1, the LAN 133 comprises a plurality of user PCs 140, 141, and 142, which communicate with a LAN server 137 via a communications link such as a token ring link, or some other communications link, as required by the particular application.

When a user desires to access information available on the Internet, the user initiates a connection with the Internet from his PC (e.g., the stand-alone PC 130 or the LAN PCs 140, 141, 142). For instance, in the case of the stand-alone PC 130, the user instructs the modem 127 to establish communication with the port server 112 via the modem link 125 and the receiving modem 120. The port server 112 directs the communication between the stand-alone PC 130 and the routing hub 100. In addition, the port server 112 allows the user to access E-mail services, news services, and the web organizer of the preferred embodiment via the ethernet link 110.

A wide range of information and services are available to the user by accessing information at different addresses via the routing hubs 100. When the user specifies an address at which information is sought, the routing hubs 100 communicate with one another to pass the address request to the appropriate location and, thereafter, to transfer the requested information back to the stand-alone PC 130. As is well known in the art, it may happen that during the course of a single transmission, multiple paths are provided between the routing hubs 100 for the data transactions.

In a similar fashion, communication may be established between the LAN PCs 140, 141, 142 and the Internet via the LAN server 137 and the high-speed communication link 135.

In accordance with the teachings of the preferred embodiment, the web organizer server 114, together with other like servers in communication with the ethernet link 110 (i.e., in communication with the Internet access provider), provides subscribing users with a geographically organized perspective of the information available by accessing the Internet. Thus, if a user is interested in finding an out-of-print book, or a good price on his favorite bottle of wine, but does not want to travel outside of the Los Angeles area to acquire these goods, then the user can simply designate the Los Angeles area as a geographic location for which a topical search is to be performed. In this example, the Los Angeles area defines a geographical search area, wherein the geographical search area is defined as a area from which topical information can be accessed, and which is a subset of the entire domain of geographic areas which can be searched for topical information. Thus, the geographic/topical organization format provided in accordance with the preferred embodiment provides the user with a valuable Internet organizing tool, since current Internet search techniques might allow the user to find the information which he is interested in, but at an undesirable location so that the user may be required to search for hours in order to find the goods or services in which he is interested at the appropriate geographic areas.

Search Method Overview

FIG. 2 is a flowchart that illustrates the overall method of the preferred embodiment whereby a user may conduct an on-line search of information based upon a geographical organization of the information. After the method begins, the user is presented with a list of geographic areas, as represented within an activity block 200. In one advantageous embodiment, if the user is a subscriber to an Internet access provider which implements the preferred embodiment, the user's PC is preset to call up a special "local geography" menu of the Internet access provider implementing the preferred embodiment (instead of, for example, the standard Netscape home page which would normally be called up). The user is then presented with a list of geographic locations that correspond to the geography local to the user. For example, if a user lives in Huntington Beach, Calif., the list of geographic locations may include a list of cities, including Huntington Beach, within Southern Calif.

This is advantageously accomplished by loading special software into the user's PC. Typically, the user is provided with a software package including a menu program and one or more local community access discs. The menu program includes, as a pull-down option, the local city or view which the user prefers. The local community options available to the user via the pull-down menu are determined by the local community access discs which, in one embodiment, include one or more Uniform Resource Locators (URLs) designating the site on the web organizer server 114 corresponding to the local community or communities. A URL is one of two basic kinds of Universal Resource Identifiers (URIs), and comprises a string of characters which is used to precisely identify an Internet resource's type and location. Thus, the software causes the map and/or list of locations local to the user to be called up first when the user accesses the organizer.

Figure 9:
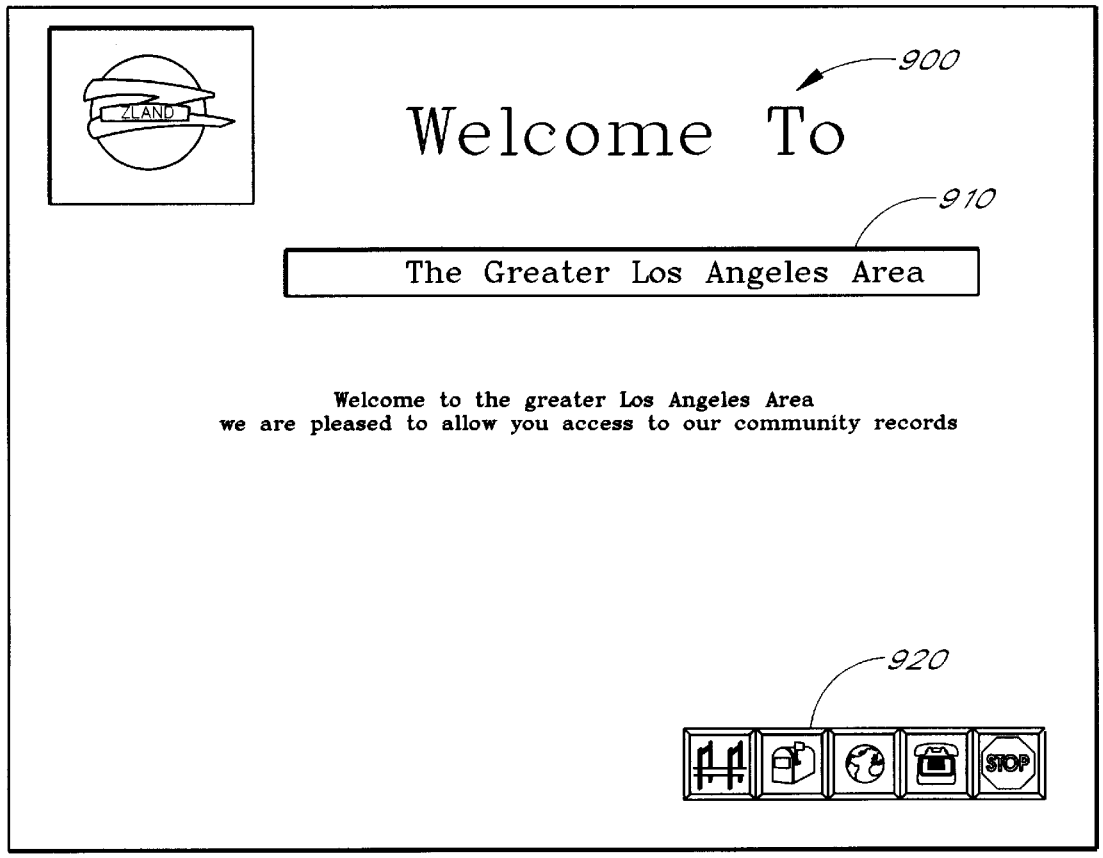
FIG. 9 is an exemplary screen display which is presented to the user when the user initially calls up the local city or region.

More specifically, in one preferred embodiment, the user PC, which runs the Netscape browser and menu programs, is preloaded with information appropriate to direct the user to a specified city or area display provided by the web organizer server 114. In particular, the Netscape browser is provided with the URLs which correspond to the local city or region displays accessible from the web organizer server 114. The URLs are provided on disc or some other media which may be downloaded to the user terminal as part of the installation software. In one preferred embodiment, the user receives a disc or discs corresponding to the local community or communities which that user designates as preferred "local" communities when the user signs up with the Internet access provider. If, for example, the user travels frequently between Los Angeles and New York City, then the user may request the discs having URLs corresponding to Los Angeles and New York City. Once the user has accessed the system a menu (see FIG. 9) is displayed to the user. As shown in FIG. 9, the menu includes a title 900 which welcomes the user to the page, and a scroll bar 910 which allows the user to select the local region or city to which the user wishes to advance (in the example depicted in FIG. 9, the scroll bar shows the "Greater Los Angeles Area" as the selected region).

If the PC has been loaded with the URL corresponding to more than one city, then the user may scroll the scroll bar up or down to each of the cities for which the PC has a URL. Once the user has scrolled to the city to which he wishes to advance, the user advances to that city by activating a connect button 920 (having a telephone icon as a graphic image). In this manner, the user is able to quickly advance to the region or city local to the user, without having to go through each level of the geographic hierarchy. It should be noted that nonsubscribers would typically be able to access the local geographic region of interest by advancing to the home page of the Internet access provider, and then advancing through the geographic hierarchy of subdirectories (i.e., from the world, to a specific continent, to a specific country, to a specific state, etc.)

Once the user has been presented with the appropriate list of geographic areas, a determination is made if the user has selected another geographic area, as represented within a decision block 205. For example, the user may desire to obtain information about some geographic area other than the area local to the user, or the user may desire to obtain information about geographic areas within a particular city, such as points of interest within Los Angeles. If it is determined within the decision block 205 that the user has selected another geographic area, then a geography database 210 is accessed in order to call up the geographic information associated with the selection made by the user.

The geography database 210 contains hierarchically ordered geographic information. In a preferred embodiment, an image map file (see FIG. 4) may also be provided wherein the image map file contains reference maps that can be graphically displayed to the user on the user's display screen. These reference maps may be actual, geographically-accurate representations of the particular geographic area which is selected, or may instead be caricatures or icons which represent a place or service associated with the selected geographic area. This provides the topical connection to the geographic region. According to a preferred embodiment of the invention, the databases are organized in a hierarchy which descends from most universal to least universal as follows: the geographic areas are ordered first by designating all of the continents in the world; then by all of the countries in each continent; then by all state, provinces, or territories within each country; then by each region within a state, province, or territory; then by each city within a region; and, finally, by each point of interest within a city. Thus, by means of the geography database 210, a user may ascend or descend in the geographic hierarchy to the particular geographic area about which information is desired.

The geography database 210 outputs the appropriate list of geographic areas to the user so that the method returns to the activity block 200. This process continues until it is determined within the decision block 205 that the user has not selected another geographic area.

Within a decision block 215, a determination is made if the user has selected a local content topic reference. That is, once the user has located the appropriate geographic area about which information is desired, the user changes to topical references using the image map reference. In this manner, topical searches are seamlessly merged with geographical searches so that the user is able to geographically pinpoint the location of the desired goods or services in which the user is interested. For example, FIG. 10 depicts an exemplary screen display which would be presented to the user when the local content topic reference is accessed. If it is determined within the decision block 215 that the user has not selected a local content topic reference, then the method returns to the input of the decision block 205 so that the method continuously loops until the user selects either another geographic area or a local content topic reference. Once the user has selected a local content topic reference, then the user is presented with a topic list, as represented within an activity block 220.

As will be discussed below, the topic list presented to the user includes a list of topics such as business services, entertainment, news, consumer goods, historic sites, etc. Each topic within the topic list may also include a subtopic list. For example, under the topic "schools," the subtopics of elementary, high school, and colleges and universities may be included. Thus, after the user is presented with the topic list, as represented within the activity block 220, a determination is made if the user has selected another topic or subtopic, as represented within a decision block 225. If it is determined within the decision block 225 that the user has selected another topic or subtopic, then a further determination is made, as represented within a decision block 235, if the user has selected a topic for which there is no further subtopic (i.e., if the user has descended to a final destination defined by the most particular topic level for that topic branch).

If it is determined that the user has selected a topic (i.e., by pointing to the particular topic on the displayed list and clicking the mouse button) for which additional subtopics exist, the system searches for the selected topic or subtopic within a local content topic/subtopic index database 230. Once the appropriate topic or subtopic has been found within the local content database 230, the associated list for that subtopic or topic is output by the local content database 230 and presented to the user, as represented within the activity block 220.

Once the user has selected a topic for which there are no further subtopics, the web organizer server 114 accesses information relating to particular companies, enterprises, institutions, organizations, or entities associated with the selected topic. These may include federal, state or local government, businesses, individuals, and the like. For example, a list of particular stores such as "Bill's Hardware" and "ACE Hardware" may be accessible under the topic "hardware stores." Thus, if it is determined that the user has selected a topic having associated information for viewing, as represented within the decision block 235, the system accesses a yellow pages database 245, as represented within an activity block 240.

If the user desires to access further information about one of the particular entities listed (for example, if the user desires to contact a particular high school), then the address, phone number, etc., of that entity (e.g., high school) would be presented to the user when the user points to the desired listing and clicks the mouse button.

In one preferred embodiment, the selection of a particular listed entity can result in one of a plurality of different results. For example, in one case, the listing may be an anchor (i.e., a hyper-link) so that the user advances to a home page defined by the selected entity. In another case, upon selection of the listed entity, a special "notes" portion of the yellow pages database 245 is accessed and information relating to the particular entity is then presented to the user.

Figure 2C:
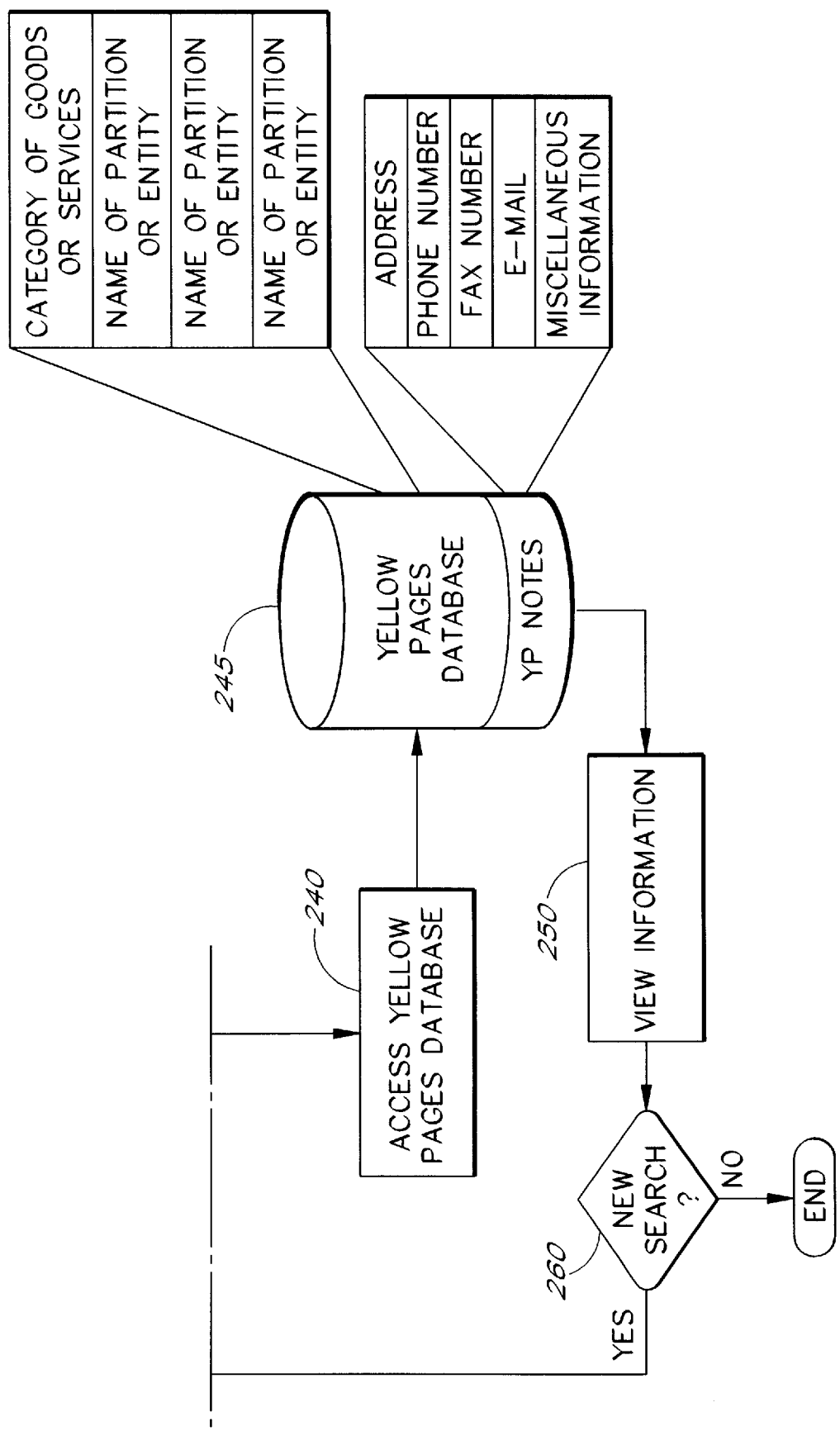
Figure 11:
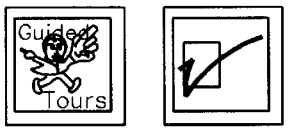
FIG. 11 is an exemplary screen display which is presented to the user when the user accesses the notes portion of the yellow pages database in order to obtain information about a final destination.

In either case, the user is presented with the opportunity to view additional information relating to the selected entity, as represented within a view information activity block 250. For example, as shown in FIG. 2C, the yellow pages database may include information such as the address, phone number, fax number, E-mail, other miscellaneous information, etc., which relates to the particular topic or subtopic selected by the user. The miscellaneous information included within the yellow pages database 245 may, for example, include interesting facts or comments about the selected topic, as well as graphical display or text advertisements, directions to the place or places associated with the topic, etc. An exemplary screen display which may be presented to the user upon access to the notes portion of the yellow pages database 245 is depicted in FIG. 11.

Once the user has viewed the information as represented within the activity block 250, the user may opt to perform another search, as represented within a decision block 260. If the user opts to perform another search, then control of the method returns to the activity block 200, where the user is presented with a list of geographic areas. As discussed briefly above, this list is advantageously defined to correspond to the particular geography of the user. If the user does not wish to perform another search, the user ends the session.

Geographic Database and Search Method

Figure 3:
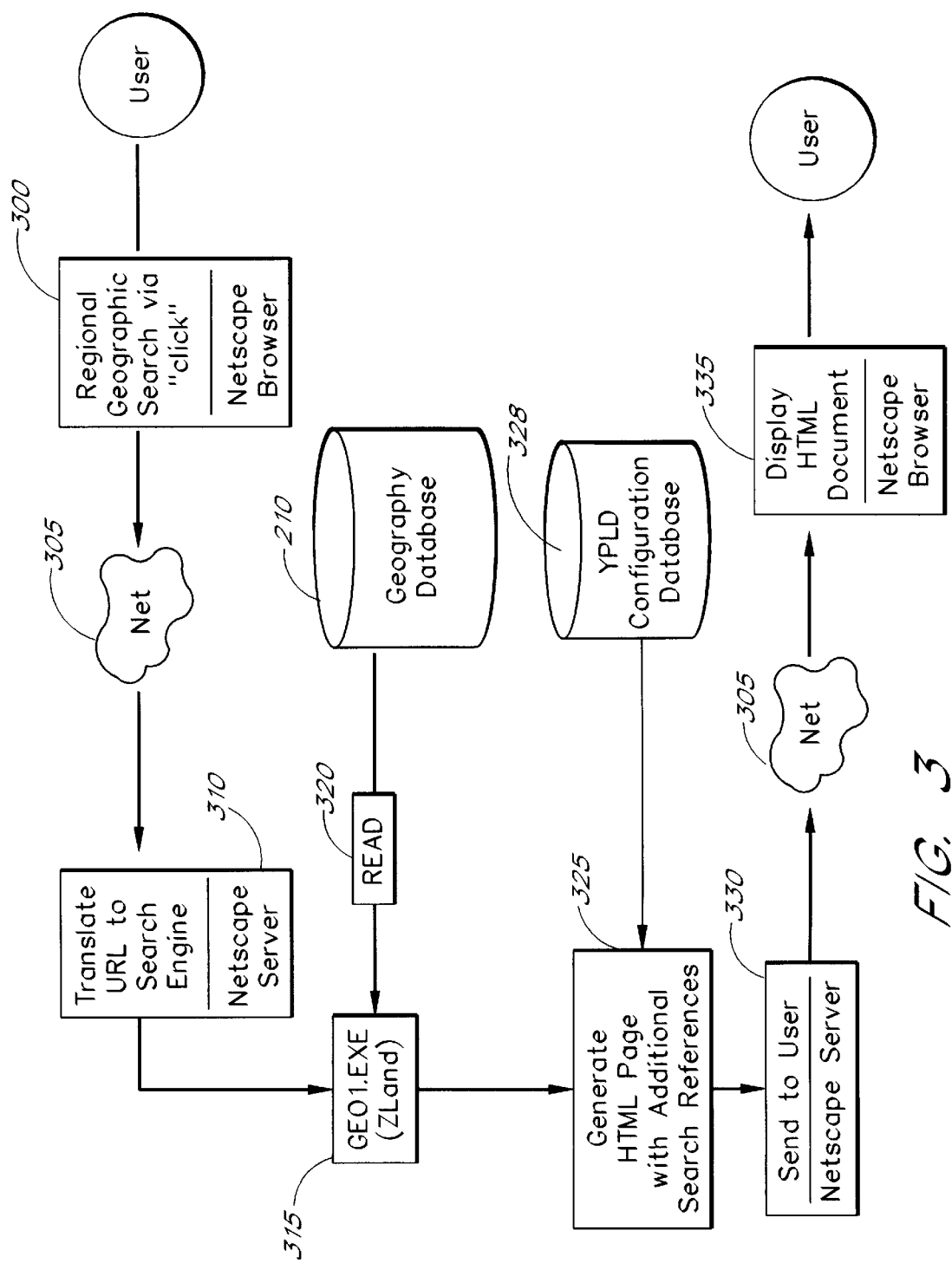
FIG. 3 is a system flow diagram that illustrates the sequence of events that occurs when the user chooses the geography query.

FIG. 3 is a system flow diagram that illustrates the method used in accordance with the preferred embodiment to service a geography query by the user. That is, when the user selects a geographic area (from the decision block 205 of FIG. 2), the system of the preferred embodiment processes this request and provides the request to a search engine, which searches the geography database 210 and cooperates with the search engine in order to generate the appropriate HyperText Mark-up Language (HTML) page for display to the user. For example, such a page is depicted in FIG. 12. In one advantageous embodiment of the invention, the geography database 210 includes the information to be displayed, while another database called the yellow page list description (YPLD) configuration database includes the display format information. The search engine combines the information from the geography database 210 and the YPLD configuration database to generate the HTML document.

As depicted in FIG. 3, the user initiates a regional geographic search from, for example, a personal computer (PC) or terminal connected to the Internet. As represented within an activity block 300, the Netscape browser, which is well known to those of skill in the art, assists the user in performing a regional geographic search via the conventional point-and-click method with a system mouse on an HTML anchor. That is, the user positions the mouse pointer over the listed geographic area for which a search is desired, and depresses a mouse button to select the geographic area. The search request is transmitted via an Internet link 305, which, for example, may comprise a T1 link, a telephone line, or some wireless cellular connection that is well understood in the art. Once the search is transmitted over the Internet connection 305, a Uniform Resource Locator (URL) is translated, by a Netscape server hosting the geographical search engine 315, into a format readable by the search engine within the local Netscape server, as represented within an activity block 310.

As discussed briefly above, a URL is one of two basic kinds of Universal Resource Identifiers (URIs), and comprises a string of characters which is used to precisely identify an Internet resource's type and location. For example, a URL includes a stem (e.g., "http://" if the document is a WWW document); a domain name of the computer on which the resource is stored (e.g., www.bruin.ucla.edu); a location within the directory structure (e.g., wpdata/eaw/); and the document name and extension (e.g., eaw-3001.cmp).

The URL request translated by the custom-designed geographical search engine 315, performs as a subroutine call to a standard database "Read" subroutine represented by a block 320. In one advantageous embodiment, the Read subroutine 320 is accessible with the "C" computer language, and is provided by the database vendor as an applications interface. Such an applications interface is defined in accordance with database application interface standard documentation as is well understood by those of skill in the art. The Read subroutine 320 identifies the records within the geography database 210 which qualify for the search request, and returns the qualifying records to the geographical search engine 315.

In one preferred embodiment, the geographic database 210 is searched with a CGI-script process. This command uses the HTTP search command sequence, and parameter passing is handled on the command line. The HTTP search command sequence defines the path to the program, followed by a question mark, followed by parameters with each parameter separated by a plus sign. For example, the URL syntax would appear as follows:

/SEARCH/GEO1?DBNAME+YPLD$_{13}$configuration+ Dbview+m+name key

This exemplary command uses five parameters, as described below. Specifically, the parameter DBNAME corresponds to the name of the geography database to be searched. The YPLD configuration parameter is the name of a configuration document (stored within the YPLD configuration database 328). In one advantageous embodiment, different YPLD configuration documents may be used, depending upon the level of detail which the user desires to view concerning the information searched in the geographic database 210. The Dbview parameter specifies the "view" to use when searching and displaying a set of list entries. A view is defined as the geographic perspective from which the user wishes to conduct a given search. Thus, if a user wishes to search for a given file (specified by the Name Key parameter), then only those files within the subdivision of the geographic database 210 defined by Dbview will be searched. For example, if the parameter Dbview is specified as "city," this will cause the search engine to search those records having the designated folder name beneath the city level of the geographic hierarchy so that only points of interest having the given folder name will be searched.

In the preferred embodiment, when it is desired to display a list of common entries, such as all cities, the Dbview parameter is specified as a POI (Point Of Interest), CITY, REGION, SPT, COUNTRY, CONTINENT, with an appended numerical reference which represents the type of geographic reference requesting the list. Normally, when the Dbview parameter is specified as "CITY," the displayed entry will simply be the city name designated as the NameKey parameter. When it is desired to display a list of entries, however, the Dbview parameter is specified as a point of interest (POI), CITY, REGION, etc., with the appended numerical reference which represents the type of geographic reference requesting the list. The contents of the list will differ, depending on whether it is for a country, region, state, etc. In one advantageous embodiment, the number 10 is the numerical reference associated with continents; the number 20 is the numerical reference for countries; the number 30 is the numerical reference for states, provinces, or territories; the number 40 is the numerical reference for regions; the number 50 is the numerical reference for cities; and the number 60 is the numerical reference corresponding to points of interest. Note that the YPLD configuration parameter and the Dbview parameter should be used in the correct combinations so that the correct HTML is generated for the appropriate geographic view.

As an example, if the Dbview parameter is specified as SPT20, this causes all states, provinces and territories within the parent country to be listed. In this case, the parent country would be the country containing the state, province or territory specified in the NameKey parameter. As used herein, a "parent" entry is an entry (e.g., geographic or topical) which encompasses one or more children entries within the geographic or topical hierarchy, and a "child" entry is an entry which is encompassed by a parent entry within the geographical or topical hierarchy.

The fourth parameter, signified by the letter m, is an integer number that represents the number of entries to skip. This parameter may be used by the Read subroutine 320 whenever there are more than 50 entries in a list and scrolling is to be supported. In a preferred embodiment, the first search has this value always entered as zero, and subsequent scroll searches increment this value to support scrolling. Finally, the NameKey parameter indicates the name of the folder to display. As used herein, a folder is defined as a list of entries designated by a single name and accessible by that single name. Any entry whose parent folder name matches the name specified will be returned by the search.

In addition, the geographical search engine 315 performs the function of merging the information provided in the geography database 210 and the YPLD configuration database 328. The format of information contained within the geography database and the YPLD configuration database is described in greater detail below with reference to FIGS. 13 and 14, respectively.

Once the search engine has processed the request and accessed the appropriate information within the geography database 210 via the Read subroutine 320, an HTML page is generated by the cooperation of the geographical search engine 315, the YPLD configuration database 328, and the geography database 210, as represented within an activity block 325. The generated HTML page includes additional search references, which represent geographical locations associated with the geographic areas selected in the search. For example, if the continent of North America is the geographic area that is selected by the user in the search, then the generated HTML page will include Canada, the United States of America, and Mexico as additional search references listed beneath the selected North American continent. The HTML document is then sent to the user via the Netscape server (i.e., one of the routing hubs 100 which serves as the Internet link 305), as represented within an activity block 330. A sample HTML document is included in Table 4. In this manner, the HTML page may be displayed on the user's terminal via the Netscape browser interface, as represented within an activity block 335.

Image Map File and Search Method

Figure 4:
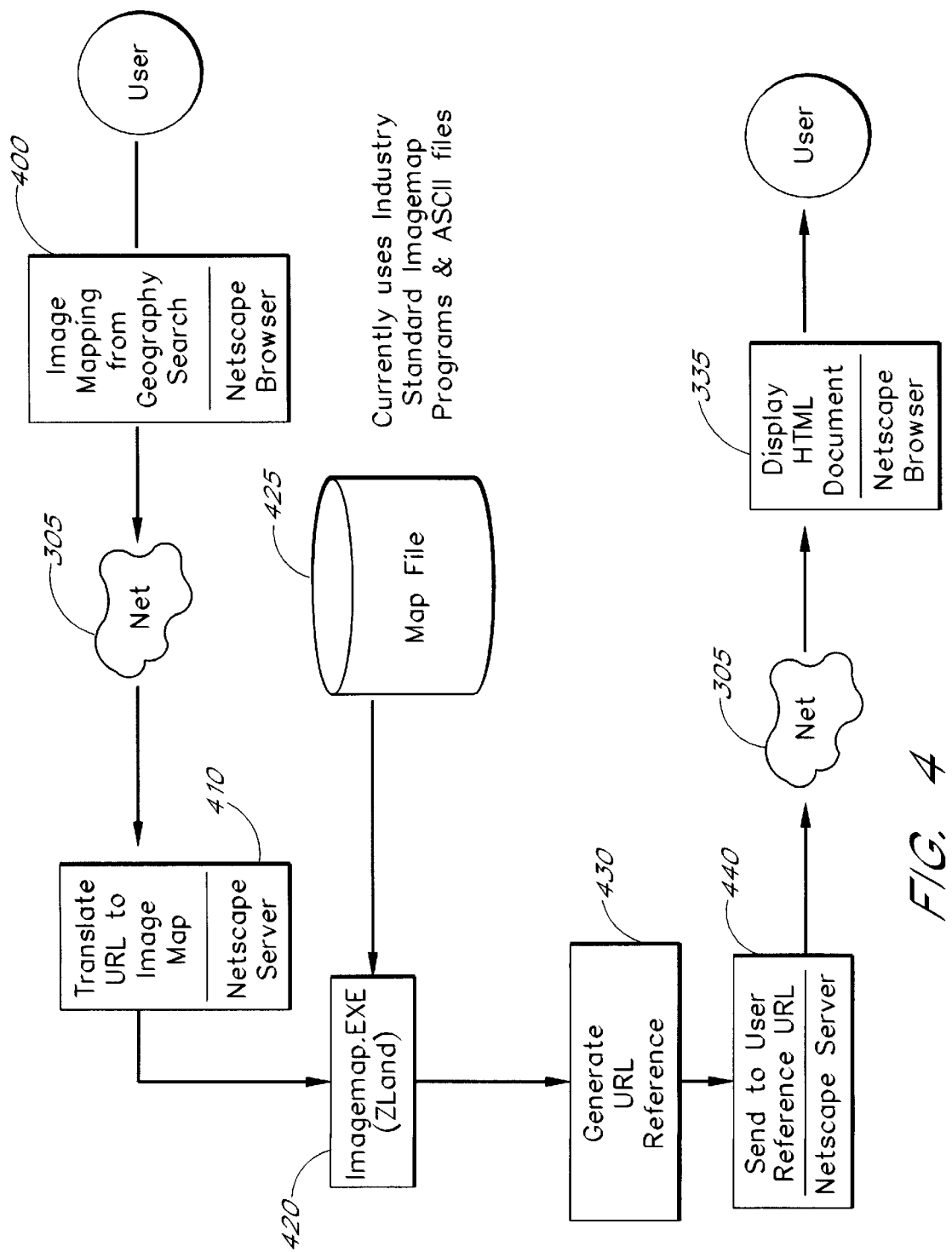
FIG. 4 is a system flow diagram that illustrates the sequence of events that occurs when the user chooses the image map query.

FIG. 4 is an exemplary system flow diagram that illustrates the method used in accordance with the preferred embodiment to process an image map query initiated by the user. When the an image map query is initiated, this indicates that a reference map (i.e., either an actual map or a caricature or icon map) is associated with the specific geographic area selected by the user. This reference map is included in the HTML document which is presented to the user on the user's PC terminal. For example, if the user selects the United States of America, then this query might result in a map of the United States with the borders of each state defined in the map to be displayed on the user's terminal.

As illustrated in FIG. 4, the user initiates an image map query via the Netscape browser, as represented within an activity block 400. An image map query may be a geographical or topical query which is made by clicking a system mouse button while the mouse pointer is positioned over selected coordinates of a graphical image. A URL corresponding to the region of the graphical image over which the mouse pointer is positioned is then generated. For example, a geographical image map query might be generated when the user positions the mouse pointer over the image of the state of California within a map of the United States of America and clicks the mouse button. Alternatively, a topical image map query might be generated when the user positions the mouse pointer over the image of a school house and clicks the mouse button.

More specifically, the user selects a point to visit within the image by using the mouse point-and-click selection method. The image map mouse coordinates are then transmitted via the Internet link 305 to a Netscape server. Within the Netscape server, the image map mouse coordinates are sent to a standard common gateway interface (CGI) program 420 which translates the image map mouse coordinates into a URL reference, as represented within an activity block 410. The image map program 420 acts to read a map file 425 in order to obtain a URL reference that matches the mouse click coordinates. More specifically, the image map program identifies the record within the map file 425 which is associated with the mouse coordinates. The configuration of data stored within the map file 425 and the program structure of the CGI program are well known to those skilled in the art. An example of this image map method is documented in many reference sources including "The HTML Sourcebook" by Ian S. Graham, John Wiley & Sons, 1995 ISBN at 471-11849-4.

In one advantageous embodiment, the geography database 210 and the map file 425 are accessible as if they constituted a single database using industry-standard image map programs, together with ASCII text files, to store topical information references relating to each geographical search. The image map program 420 uses the map file 425 to generate a URL reference, as represented within an activity block 430.

Finally, the URL reference is transmitted back to the Netscape server 440 which transfers the URL reference to the Netscape browser for display to the user 450. The YPLD configuration database 328 includes information concerning what header and trailer information should be displayed when a geographic search result is displayed to the user.

An exemplary HTML document which incorporates an image map is shown in FIG. 15. In one advantageous embodiment, the image map can serve as a bridge between the geographical and topical information accessible to the user via the system of the preferred embodiment. For example, if the user has advanced to the Los Angeles area via the geographical search, and wishes to obtain topical information concerning the educational institutions within the Los Angeles area, the user can position a mouse pointer over the portion of the image map which represents educational institutions, and click the mouse button to pull up information from the topical (i.e., local content) database 230.

Local Content Database and Search Method

Figure 5:
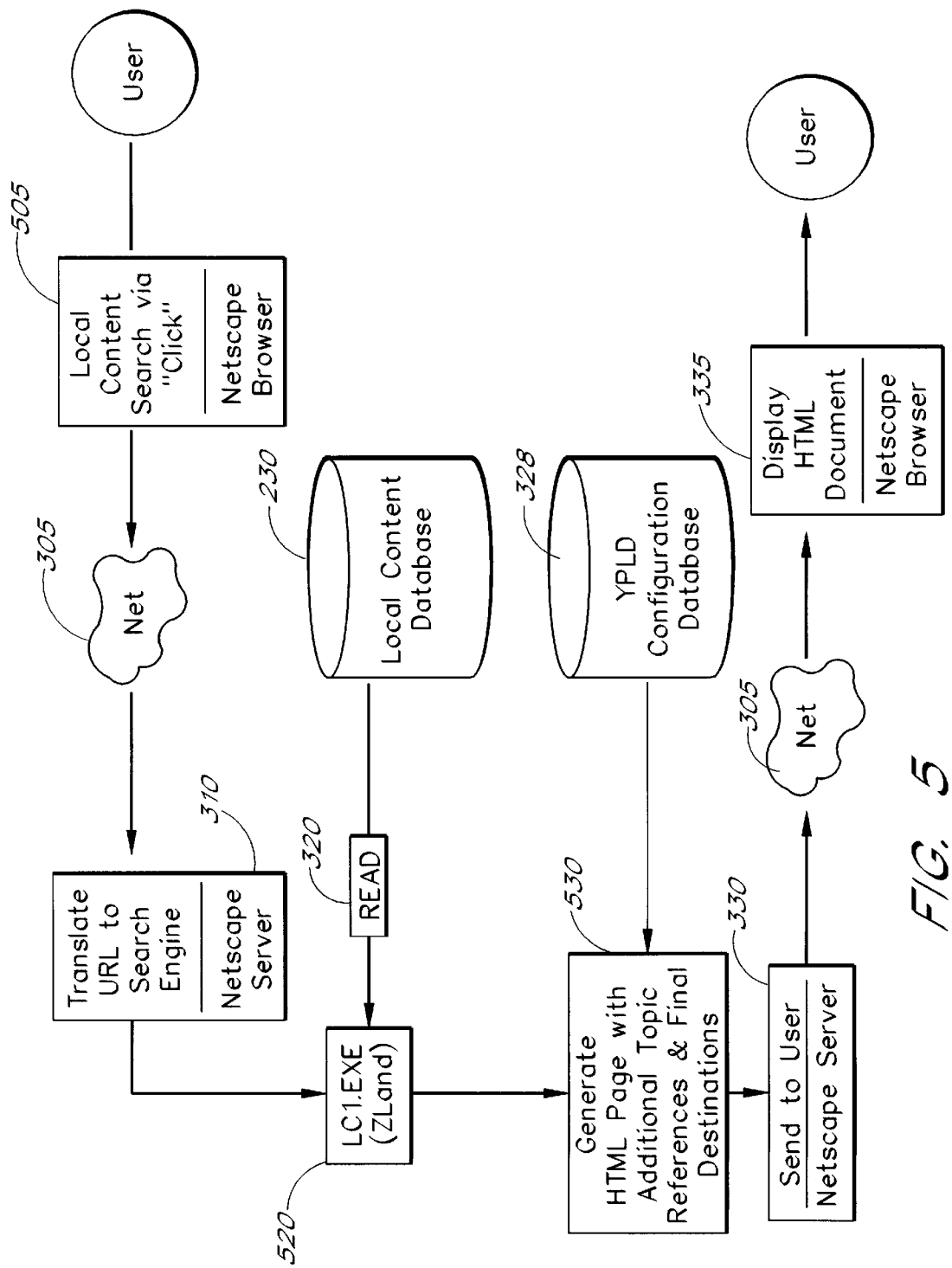
FIG. 5 is a system flow diagram that illustrates the sequence of events that occurs when the user chooses the local content query.

FIG. 5 is a system flow diagram that illustrates the general method used in accordance with the preferred embodiment to process a local content query initiated by the user. That is, when the user wishes to obtain topical information, the user initiates a local content search using the conventional point-and-click method with a mouse. As shown in the geographical queries, the local content list (see, for example, FIG. 10) includes a listing of several topics and subtopics over which the user may position a mouse pointer and click to select that particular topic or subtopic as a search query. The result of this query, after processing over the Internet, is the display of a new list which shows the subtopics associated with the selected topic.

As represented within an activity block 505 in FIG. 5, the user performs a local content search using conventional click-and-point techniques with a mouse. As with the regional geographic search, the local content search is performed using the instrumentality of the Netscape browser interface. In one advantageous embodiment, the Internet access provider sends an HTML document to the Netscape browser which includes a list of URLs for every hyper-link. When the user activates a hyper-link to another document (e.g., by clicking the mouse button while the mouse pointer is positioned over the appropriate region), the corresponding URL is provided to the Netscape server by the browser. The search request is transmitted via the Internet link 305 to one of the Netscape servers, which translates the URL to a format which can be interpreted by a local content search engine 520. The translation of the URL is represented within an activity block 310, which is substantially similar to the activity block 310 of FIG. 3.

The local content search engine 520, which in one embodiment comprises an executable file which operates on the Netscape server, passes the translated URL to the Read subroutine 320 which used the URL to search the local content database 230 via the Read subroutine 320.

In one preferred embodiment, the local content database 230 is searched with a CGI-program process. This command uses the HTTP search command sequence, and parameter passing is handled on the command line. The HTTP search command sequence defines the path to the program, followed by a question mark, followed by parameters with each parameter separated by a plus sign. For example, the URL syntax would appear as follows:

/SEARCH/LC1?DBName+YPLD_Configuration+ DBView+m+FolderName

This exemplary command uses five parameters, as described below. Specifically, the parameter DBName corresponds to the name of the local content database to be searched. The YPLD configuration parameter is the name of a configuration document (stored within the YPLD configuration database 328). In one advantageous embodiment, different YPLD configuration documents may be used to limit the entries or to affect the ordering of the entries which the user desires to view concerning the information searched in the local content database 230. The Dbview parameter specifies the "view" to use when searching and displaying a set of list entries. A view defines the set of entries from which the user wishes to conduct a given search. Thus, if a user wishes to search for a given topic or list of topics (i.e., the folder specified by the FolderName parameter), then only those entries within the subdivision of the local content database 230 defined by Dbview will be searched. For example, if the parameter Dbview is specified as "city," this will cause the search engine to search those topical records having the designated folder name and which are stored in the view named city.

The fourth parameter, signified by the letter m, is an integer number that represents the number of entries to skip. This parameter may be used by the Read subroutine 320 whenever there are more than 50 entries in a list. This value is always started as zero and incremented to provide a search scrolling feature. Finally, the folder name parameter indicates the name of the folder to display. As used herein, a folder is defined as a list of entries designated by a single common name and accessible by that single name. Any entry whose parent folder name matches the name specified will be returned by the search.

Figure 16:
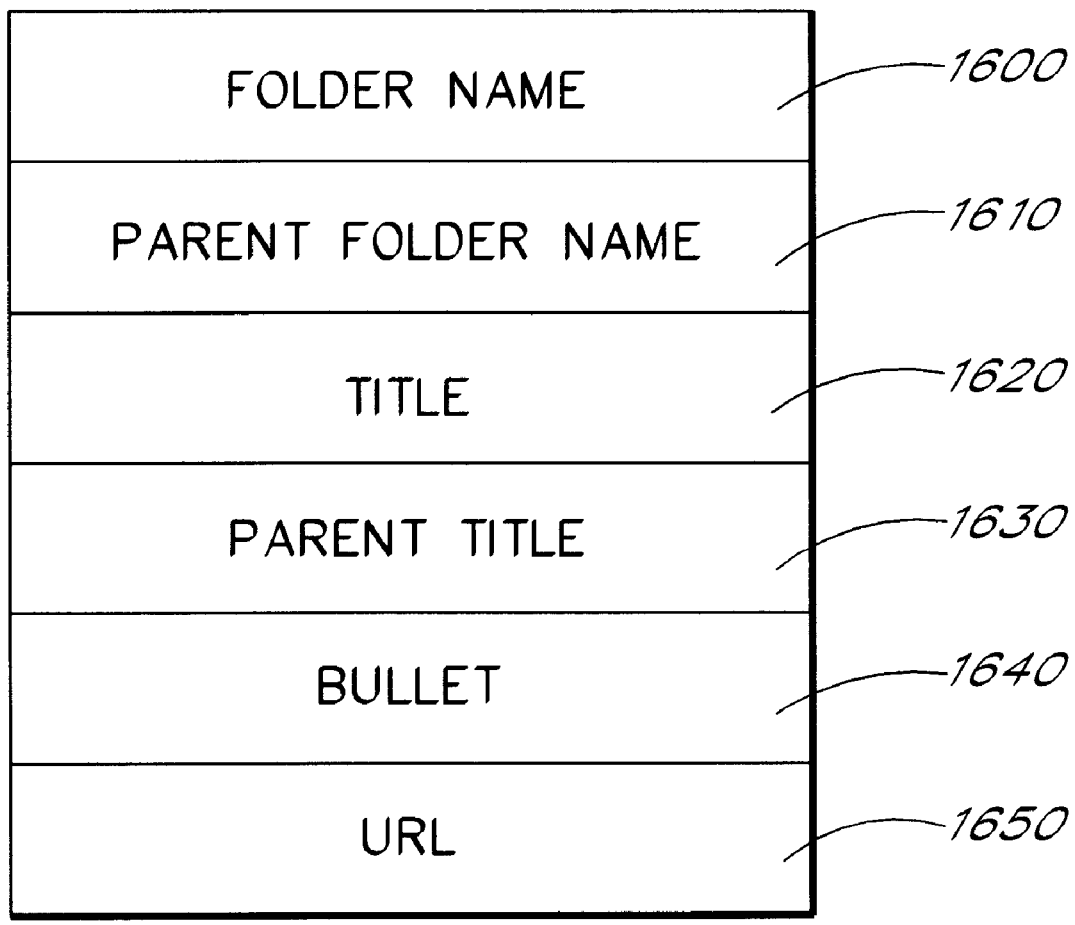
FIG. 16 is a schematic diagram which illustrates the format of data stored with the local content database.

Once the appropriate topic or subtopic information is located within the local content database 230, the local content search engine 520 using information provided by the YPLD configuration database 328, together with the information output by the local content database 230 via the Read subroutine 320, generates an HTML page that lists the topics or subtopics associated with the topic which was the search request. For example, if the topic "schools" was the object of the search request, then an HTML page that lists subtopics such as elementary schools, middle schools, high schools, and colleges and universities would be generated, as represented within an activity block 530. The format of information contained within the local content database 230 is depicted in FIG. 16, and will be described in greater detail below.

In addition, if a given topic or subtopic includes final destinations (i.e., subjects about which information such as telephone numbers, addresses, etc., is available), such information may be presented for viewing by the user by accessing the yellow pages database 245, as described below. Once the HTML document has been generated, this document is sent to the user via the Netscape server and the Internet link 305, as represented within an activity block 330. A sample local content HTML document is included in Table 3. Finally, the HTML document is displayed on the user's terminal via the Netscape browser interface, as represented within an activity block 335.

Yellow Pages Database and Search Method

Figure 6:
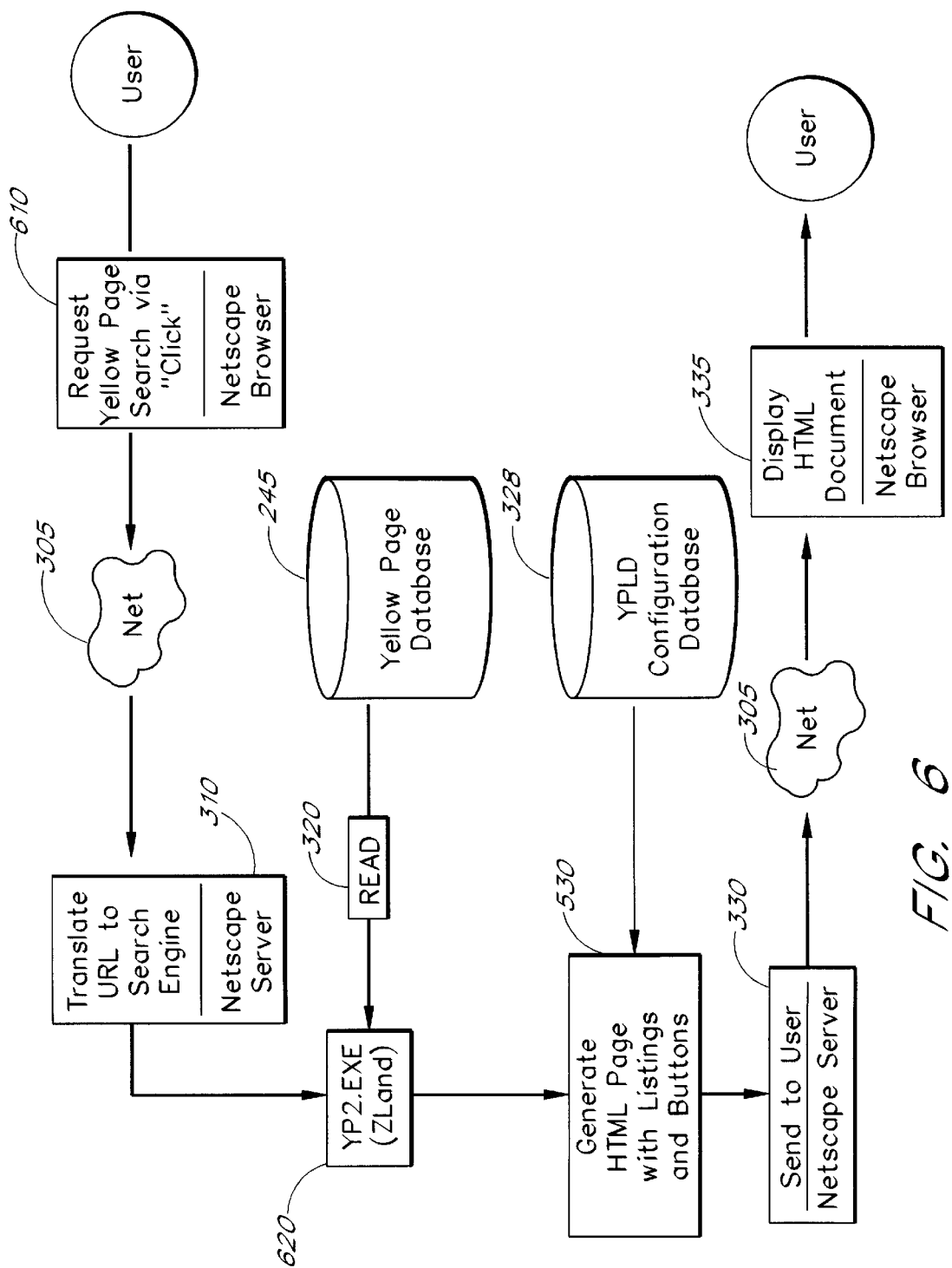
FIG. 6 is a system flow diagram that illustrates the sequence of events that occurs when the user chooses the yellow page query.

FIG. 6 is a system flow diagram that illustrates the general method used in accordance with the preferred embodiment to process a yellow page query initiated by the user. That is, when the user wishes to access information about individual goods, services, or other topics, (i.e., final destinations), the user points to and clicks over the given topic or subtopic in order to view the individual information pertaining to that topic or subtopic. This transfer to the yellow page query is defined as a final destination in the local content HTML document 335.

Thus, as depicted in FIG. 6, the user requests a yellow page search via the click-and-point method, as represented within an activity block 610. This request is passed to the Internet via the Netscape browser interface. Once the request is passed over the Internet link 305, the URL generated by the Netscape browser is translated by the local Netscape server 310 into a format that is readable by the yellow pages search engine 620. The translation of the URL into a format that is readable by the Read subroutine 320 is represented within an activity block 620.

Like the geography search engine and the local content search engine, the yellow pages search engine 620 is advantageously implemented as an executable file that operates on the Netscape server, and operates in substantially the same manner as the geography search engine and the local content search engine to translate the URL into the appropriate format for use by the Read program to access the yellow pages database 245. The format of data stored within the yellow pages database 245 is depicted in FIG. 17, and will be described in greater detail below.

A search command used for the yellow pages database differs from the search command used with the geographic or local content databases 210, 230 in that one or more key word parameters may be used in place of the folder name parameter passed for the searches performed on the geographic and local content databases 210, 230. When a key word search is performed, any entry whose key word matches the value specified (partial match, ignoring case) will be returned as a search result. In addition, more than one key word may be searched at a time.

Once the Read subroutine 320 locates the information to be viewed, this information is passed to the yellow pages search engine 620. Thereafter, the search engine 620, in cooperation with the information provided by the yellow page database 245, and the YPLD configuration database, is used to generate an HTML page that lists the desired information. For example, FIG. 18 shows an exemplary screen shot which depicts an HTML page that might be displayed to the user when information from the yellow page database 245 is viewed. The generation of the HTML page is represented within an activity block 630.

Thereafter, the HTML page, together with the appropriate listings and button options (as defined by the YPLD configuration database), is sent to the user via the Netscape server and the Internet link 305, as represented within an activity block 330. A sample yellow pages HTML document is included as Table 2. Finally, the HTML document (e.g., the document of FIG. 18) is displayed to the user on the user's PC terminal in the format provided for by the Netscape browser interface, as represented within an activity block 335.

Yellow Page Note Query and Retrieval

Figure 7:
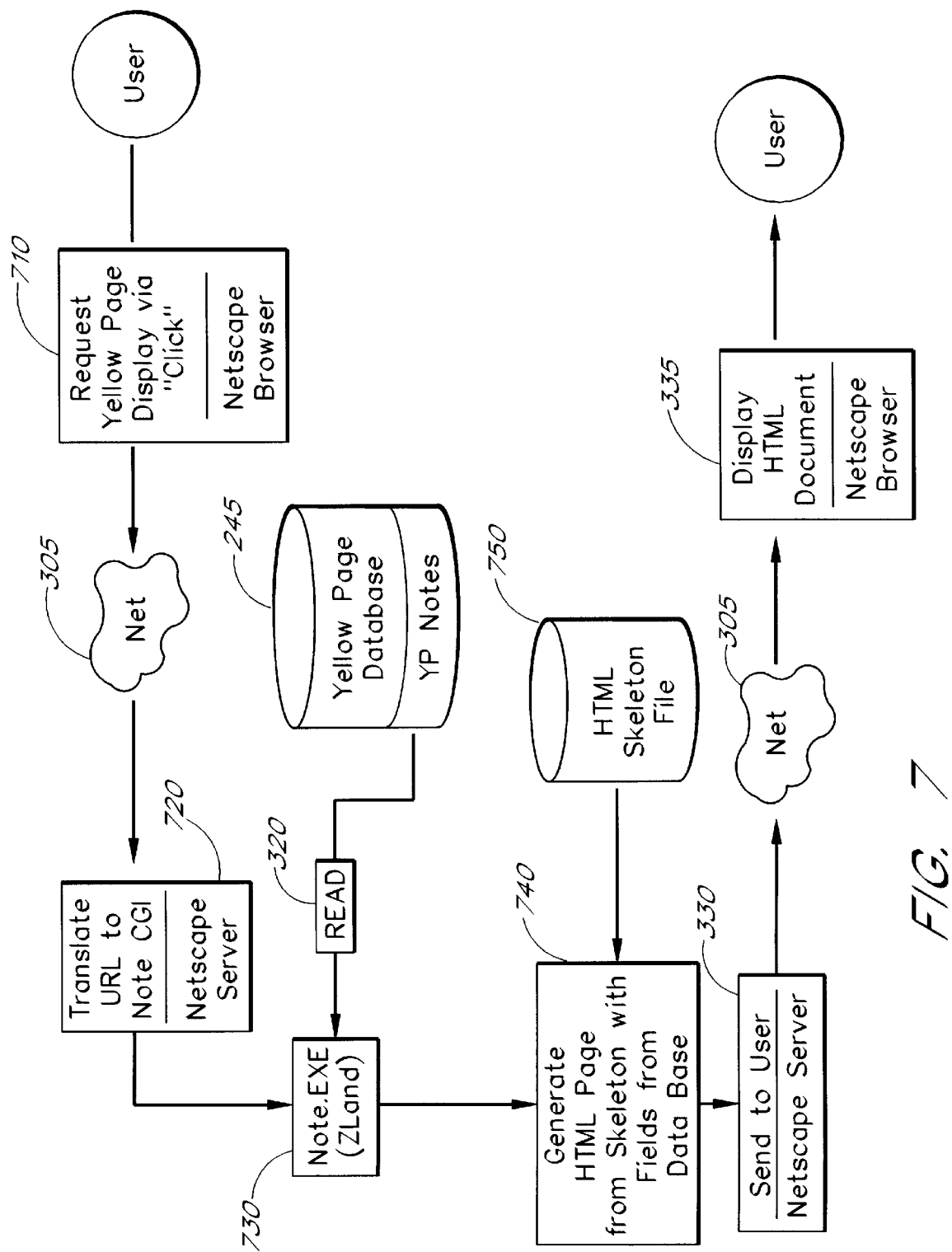
FIG. 7 is a system flow diagram that illustrates the sequence of events that occurs when the user chooses the display yellow page function.

FIG. 7 is a system flowchart that illustrates the method used in accordance with the preferred embodiment to process a yellow page display request initiated by the user. That is, when the user wishes to display information stored within the yellow page database 245 associated with an individual entity (i.e., a final destination of the yellow pages database), the user utilizes the conventional point-and-click method to initiate a yellow page display request. For example, once the user has advanced to a list of final destinations (e.g., Bill's hardware, ACE Hardware, and Handyman's Home Supplies under the topic of "Hardware Stores") using the yellow pages search engine, the user simply positions the mouse pointer over the appropriate final destination and clicks to access further information via the Notes portion of the yellow pages database 245. Thus, as depicted in FIG. 7, the user requests a yellow page search via the click-and-point method, as represented within an activity block 710.

This request is passed to the Internet via the Netscape browser interface. Once the request is passed over the Internet link 305, the URL generated by the Netscape browser is translated within a Netscape server 720 into a format that is readable by the note search engine 730. The Note search engine operates in substantially the same manner as the yellow pages search engine 620 to translate the URLs. Of course, it will be understood by those of ordinary skill in the art that due to the difference in the format of the data contained in the Notes portion of the yellow pages database 245 from the format of data contained in the other databases (e.g., the local content database), a slightly modified translation method will be used in the note search engine 730.

Figure 19:
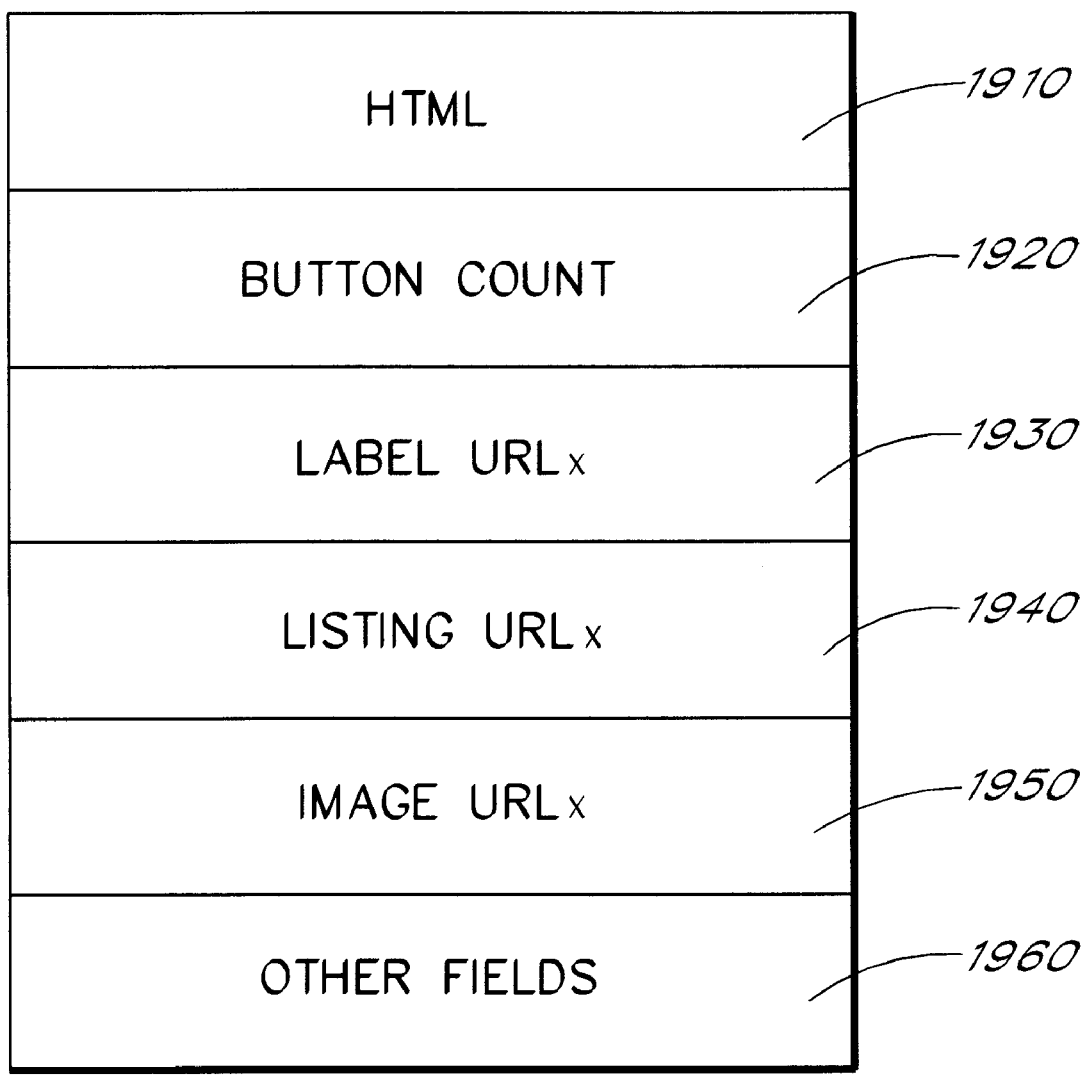
FIG. 19 is a schematic diagram which illustrates the format of data stored within the notes portion of the yellow pages database.

The note search engine 730 is advantageously implemented as an executable program that operates on the Netscape server. The format of the data contained within the notes portion of the yellow pages database 245 is shown in FIG. 19. More specifically, the search command used in accordance with the notes search engine is significantly different than that used in accordance with the geographic and local content databases 210, 230. In one actual embodiment, only three parameters are used in the search command. The first search parameter is the database name, which is the name of the yellow page containing the data to print. The second parameter is a note identifier, which defines the database storage or record number for that specific record or document in the notes portion of the yellow pages database 245. Thus, the second parameter constitutes a unique record identifier containing the information to publish. Finally, the third parameter passed is the name of the field in the record which contains the name of the HTML skeleton file 750. For example, the command line \SEARCH\NOTE?HB+YP+23467128 displays the entry 23467128 from the HP\YP database. The HTML skeleton file name is stored in the entry "23467128" in the field HTML.

Once the Read subroutine 320 locates the information to be viewed, this information is passed to the note search engine 730. Thereafter, the note search engine 730, in cooperation with the information provided by the notes portion of the yellow page database 245 and an HTML skeleton file 750, is used to generate an HTML page that lists the desired information. For example, FIG. 11 shows an exemplary screen shot which depicts an HTML page that might be displayed to the user when information from the notes portion of the yellow page database 245 is viewed. The generation of the HTML page is represented within an activity block 740.

Figure 20:
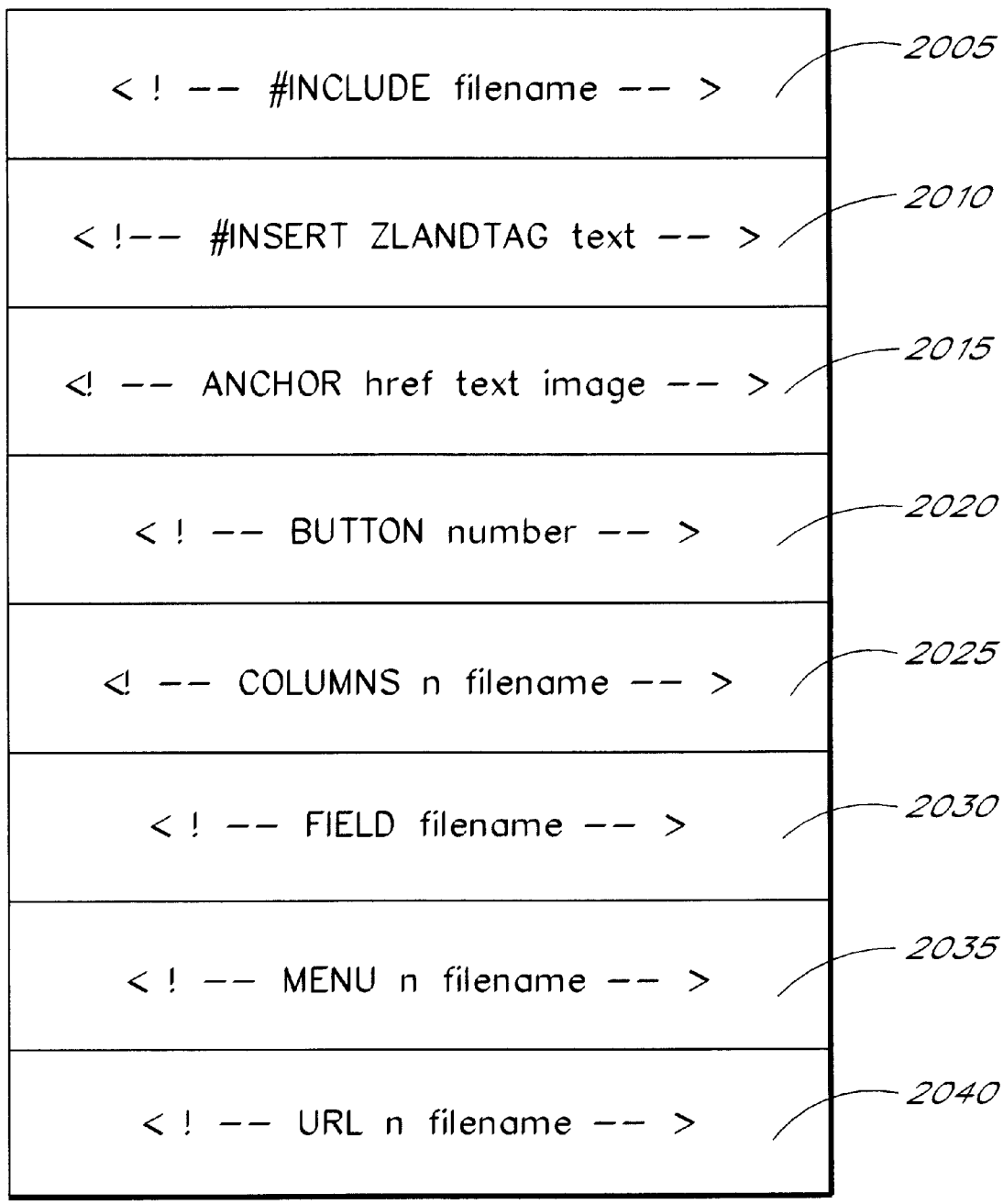
FIG. 20 is a schematic diagram which illustrates the format of data contained within the HTML skeleton database.

The HTML skeleton file 750 serves a function which is similar to that provided by the YPLD configuration database 328. Specifically, the HTML page is generated using format information contained within the HTML skeleton file 750. However, in contrast to the YPLD configuration database 328, the HTML skeleton file 750 stores a template which is configurable based upon the type of information available within the retrieved notes document (i.e., the document retrieved from the notes portion of the yellow pages database 245). A sample HTML skeleton file is included in Table 5. For example, if the information contained within the notes document includes a fax number, an E-mail address and an advertisement graphical image, the notes document will include a header field which designates which template parameters should be used to dynamically construct an HTML page suited for the display of the information contained within the notes document. An exemplary illustration of the format of data contained within the HTML skeleton file 750 is depicted in FIG. 20, and described in greater detail below.

Thereafter, the HTML page, together with the appropriate listings and button options, is sent to the user via the Netscape server and the Internet link 305, as represented within an activity block 330. A sample Note HTML document is included as Table 1. Finally, the HTML document (e.g., the document of FIG. 11) is displayed to the user on the user's PC terminal in the format provided for by the Netscape browser interface, as represented within an activity block 335.

Overview System Data Structure

Figure 8:
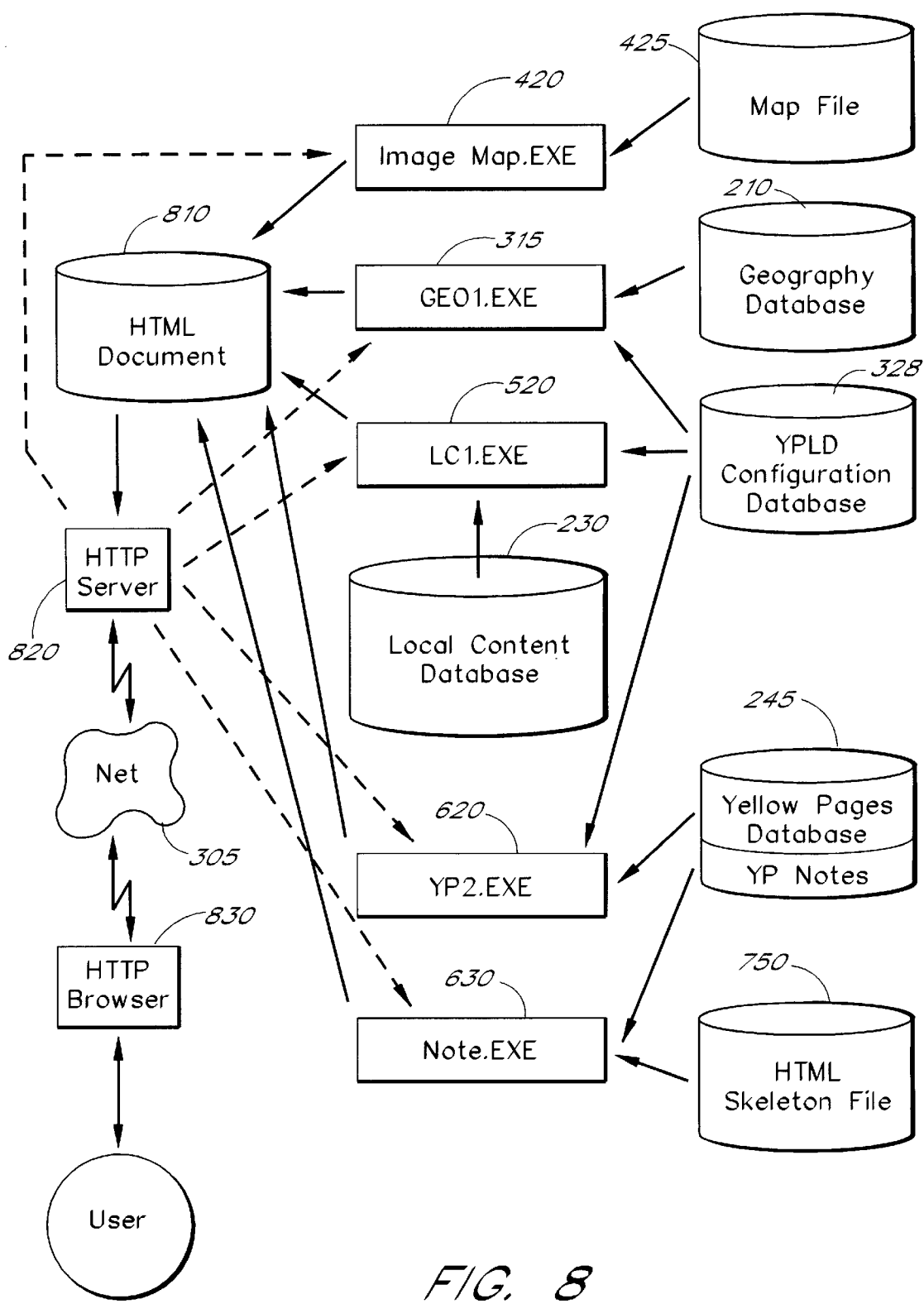
FIG. 8 is an overall system structure diagram that illustrates the data structures and search engines, as well as the interrelation between the search engines and data structures, used to implement the preferred embodiment.

FIG. 8 is an overall system data structure diagram that illustrates the relationships between the multiple databases and executable files used as search engines to access the databases. As shown in FIG. 8, the user interfaces with the Internet via the Internet link 305 and an HTTP browser 830 (e.g., the Netscape browser). An HTTP server 820 represents the local Internet server to which the user connects when communication is established on the Internet. This HTTP server 820 runs a plurality of executable program (or cgi-programs) which act as search engines for accessing information on the several databases within the system of the preferred embodiment. More specifically, the HTTP server 820 is configured to run the GEO1.EXE executable file, which serves as the geographical search engine 315; the IMAGEMAP.EXE executable file, which serves as the image map program 420; the LC1.EXE executable file, which serves as the local content search engine 520; the YP2.EXE executable file, which serves as the yellow pages search engine 620; and the NOTE.EXE executable file, which serves as the note search engine 630.

It will be appreciated by those of skill in the art that although the HTTP server 820 is represented as a single server in FIG. 8, the HTTP server 820 of FIG. 8 may actually represent multiple servers as called for by the specific application. Each of the executable files which act as search engines when run on the HTTP server 820 communicates with one or more databases stored in memory in a LOTUS/ NOTES database environment on the HTTP server 820. Specifically, the image map program 420 communicates with the map file 425 the geographical search engine 315 communicates with the geography database 210, as well as the YPLD configuration database 328, which is used in conjunction with the geographical search engine 315 to generate the HTML page; the local content search engine 520 communicates with the local content database 230, as well as the YPLD configuration database 328; the yellow pages search engine 620 communicates with the yellow pages database 245, as well as the YPLD configuration database 328; and the note search engine 630 communicates with the yellow pages database 245, as well as the HTML skeleton file. Each of the search engines outputs data to an HTML document 810, which in turn is processed by the HTTP server 820 and which sends HTML documents to the HTPP Browser 830 through the Internet 305.

It should be noted that each of the databases described above need not comprise a single database stored in a single computer. In practice, the databases can actually comprise information stored over several of the routing hubs 100.

Geographic Database

Figure 13:
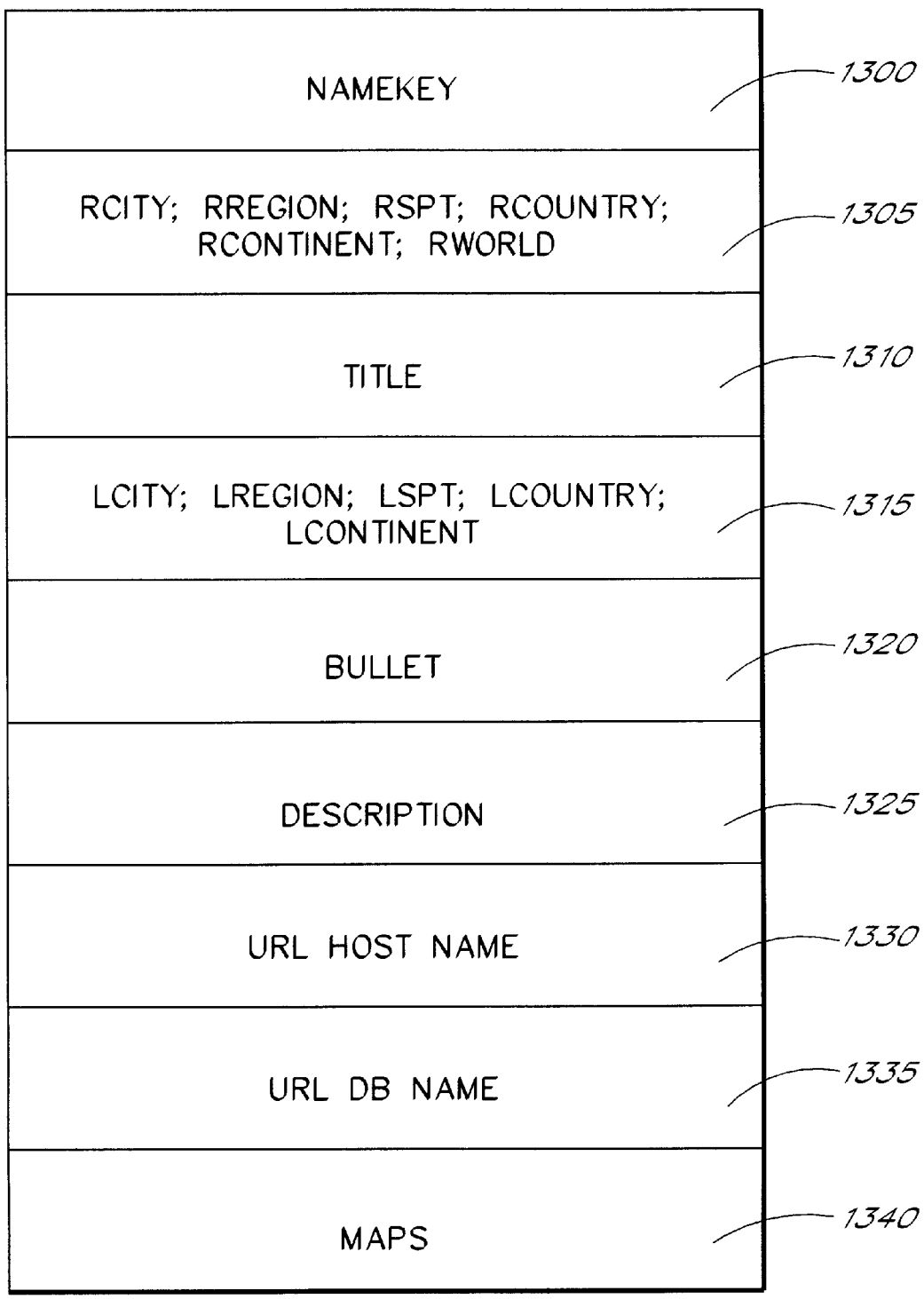
FIG. 13 is a schematic diagram which illustrates the format of data contained within the geographic database.

FIG. 13 is a schematic diagram which illustrates the format of data stored within the geographic database 210. Sample entries for the geography database 210 are included in Table 7. A first field 1300, designated as the namekey field, contains the data word which is the key under which the geographic hierarchy is recorded and searched. Each namekey should be unique within the database. For example, in a preferred embodiment, the namekey constitutes a character string built from other namekey values that appear in the current entry's hierarchy. That is, the namekey character string which designates a particular city is constructed from the namekey of the continent, country, state, and region namekeys for the continent, country, state, and region in which the city is located. For example, the city of Huntington Beach will have a namekey constructed from the namekey corresponding to North America, the United States, California, and Southern California.

Each namekey is made unique by appending text to its parent's hierarchial name. The naming convention is to use two capital letters for continents, four or fewer capital letters for countries, states, provinces or territories, regions and cities. Points of interest can be designated by any text, but a short name is best. A dot is used to separate each name part. For example, the namekey value NA.US.CA.SC.HB where the continent is North America, the country is the United States Of America, the state is California, the region is Southern California and the City is Huntington Beach. Thus, the namekey for the City of Huntington Beach is constructed from the hierarchy of parent namekeys together with the appendix HB designating the particular city.

Once these namekeys have been established, they should not be changed. This is because subentries contain a reference to these names as their parent hierarchy so that to change a namekey for one location would require changing the namekey for all locations contained in the hierarchy beneath the location which has its namekey changed.

The data contained within the geographic database 210 also includes reference fields 1305 which include a reference city, reference region, reference state, province or territory, reference country, reference continent, and reference world values. These values are the parentage name keys related to the current entry, and provide the key to displaying related entries to the internet user, and are automatically inherited from the parent entry. These reference values are used to retrace the path back through the geographic hierarchy when the user wishes to return to a related (e.g., parent) location display screen.

The data stored within the geographic database 210 also includes a title field 1310 which stores text data that is shown to the user as the descriptor for this particular entry. The title may be modified at any time. For example, FIG. 12 includes the title "Earth" which corresponds to the text stored within the title field 1310.

The data stored within the geographic database 210 further includes label fields 1315 which include text fields shown to the user as folder titles (i.e., listed areas under the selected geographic area) for each of the parent geographic entries related to the current entry. Text fields are included for cities, regions, states, provinces or territories, countries, or continents. For example, if the user selects the state of California as the current entry, then the names of the parent geographic areas related to the state of California (i.e., the United States of America, North America, and the World) will be taken from the label field 1315 and displayed in the HTML document. In addition, the children entries related to the state of California are then inserted beneath the "California" entry by the geographical search engine 315 based upon the value of the Dbview parameter, as will be discussed in greater detail below. The label field 1315 is automatically inherited from the parent entry, and the values within the label field 1315 should not be changed.

A bullet field 1320 comprises the name of a file containing a graphical image to highlight one or more of the listed text entries from the label field 1315. Normally, a yellow ball, or other graphic, will be displayed next to each listed entry. If some graphic other than a yellow ball is to be displayed, then the name of a file corresponding to that graphic is entered within the bullet field 1320. Usually, this will be one of the generic images stored on the server. Advantageously, the bullet field 1320 should contain an absolute path name, for instance, \BULLETS\YELLOWBALL.GIF.

A description field 1325 contains HTML text which is displayed for a nonlist entry. This text may, for example, include information about the current entry, or may provide the user with a greeting, etc. It should be noted that in one embodiment this text does not contain any new line characters (carriage returns), since these denote the end of a text file to the Lotus/Notes interface.

A URL host name field 1330 contains a path name to the URL host associated with each HTML anchor reference generated for an entry. Whenever an HTML anchor reference is generated for an entry, it is first assumed that this anchor reference is on the current HTTP host, unless a different host name is specified within the URL host name field 1330.

A URL DB name field 1335 specifies a database name whenever an HTML search reference is generated for an entry. It should be noted, however, that whenever an HTML search reference is generated for an entry, that the search reference is first assumed to be within the current database unless a different name is specified within the URL DB name field 1335.

Finally, the data stored within the geographic database 210 includes a maps field 1340. The maps field 1340 is an HTML text area which is displayed after the description text. If the field begins with the keyword IMAGEMAP:, then the text immediately following the colon is presumed to be the name of the image map and a matching graphics image format file. When the IMAGEMAP: keyword is found, an HTML anchor and associated ISMAP reference is automatically generated. For example, if the maps field 1340 begins with the keywords IMAGEMAP:SAMPLE, then an anchor will be created using IMAGEMAP, wherein IMAGEMAPS/SAMPLE.MAP is the image map configuration and \HTTP\IMAGEMAPS\SAMPLE.GIF is the graphic image to be displayed. In this manner, graphic image files may be seamlessly merged with text files and displayed to the user within the HTML document.

The YPLD Configuration Database

Figure 14:
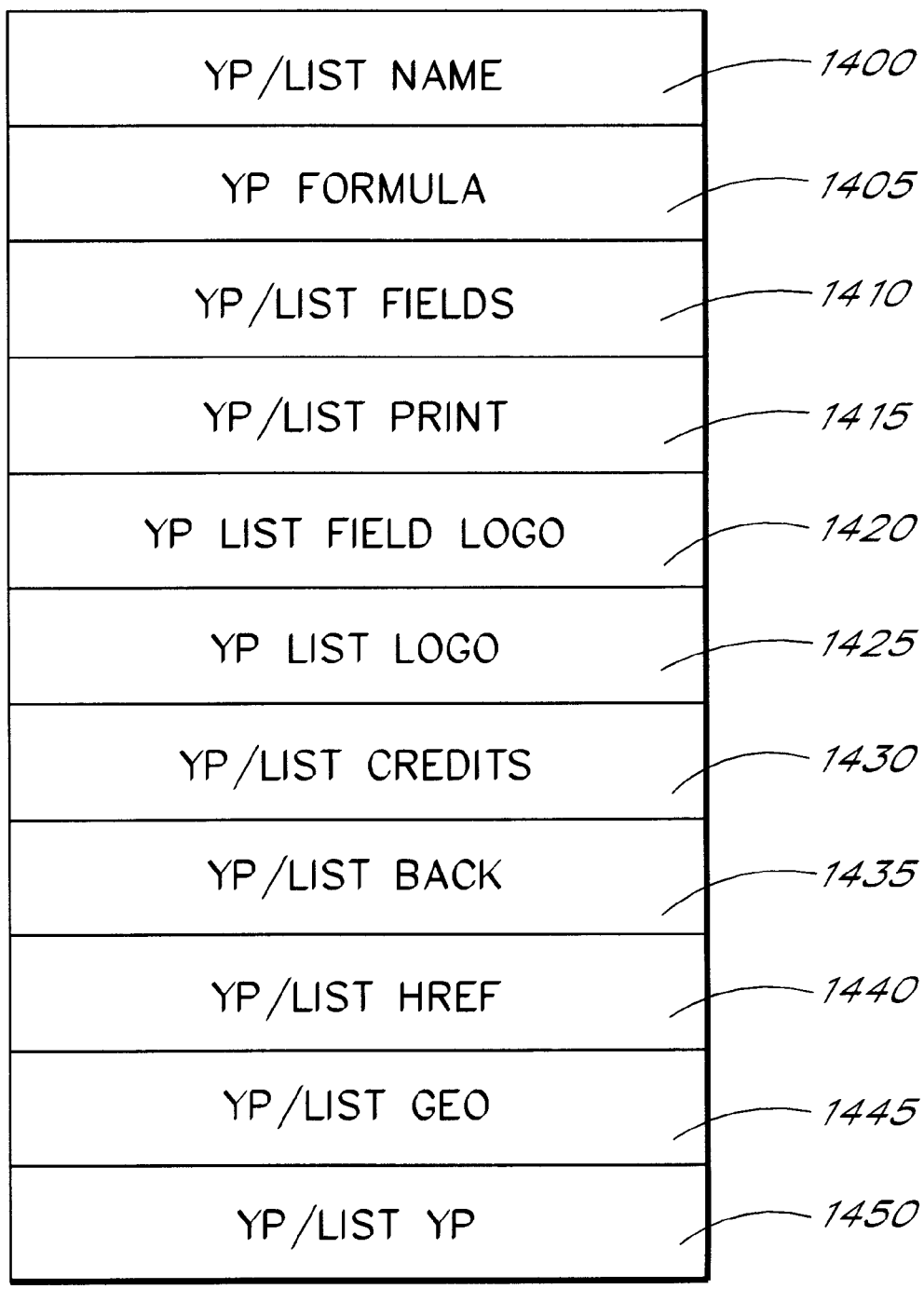
FIG. 14 is a schematic diagram which illustrates the format of data contained within the yellow page list description (YPLD) configuration database.

FIG. 14 schematically depicts the format of data stored within the YPLD configuration database 328. Sample entries to the YPLD configuration database are included in Table 6. As discussed briefly above, the YPLD configuration database acts as a kind of resource which is accessed during the main operating procedure to generate HTML documents during geographic and topical queries. The data stored within the YPLD configuration database 328 is shown in FIG. 14 to include a header which comprises a YP list name field 1400 which includes the YPLD configuration name specified on the search command line. A YP formula field 1405 contains the formula (in database selection syntax) specifying a subset of the view to search. That is, using the formula field 1405, a publisher can specify a particular subtopic or subview (as a sort of appendix to the search name) in order to more quickly access the information desired for a given application. Thus, the YP List Formula field 1405 is particularly advantageous in implementations where it is desirable to advance to a prespecified topic without the necessity of advancing through each level of topical information which encompasses the desired topic.

The data contained within the YPLD configuration database 328 further includes a YP list fields field 1410. The field 1410 contains a list of fields to display within the HTML document. These fields are separated by commas and are listed in the order in which they are to be displayed. Empty square brackets can be entered in this field (i.e., instead of a field name) to designate that a button, defined by the label, listing and image URLs, is to be printed in that region of the text.

A YP list print field 1415 stores a text label to display before each field. If no label is to be printed for a given field, a hyphen is used within the YP list print field 1415. The labels are entered in their print order, separated by commas. Furthermore, HTML mark-up tags can be specified within the labels.

A YP list field logo field 1420 includes an HTTP relative path name of a graphics image format file to use as the bullet for this list. As discussed above, a bullet is a small logo or graphic icon which is placed before important items within a list displayed to the user. If this field is left blank, the default bullet file (e.g., \BULLET\YELLOW.GIF) is used. A YP list logo field 1425 specifies an HTML string that is displayed at the top of the page. This can include the database title and the database view. In one embodiment, a "%s" symbol is advantageously used where each is to be displayed, in accordance with known script encoding techniques. The parameters are always printed in title and view order. If the YP List Logo field is not specified, the following default string is used:

<center><B>%s</B><br><B>%s</B></center><br>

A YP list credits field 1430 specifies an HTML string that is displayed at the bottom of the page. This should be used to print credits and other trademark text for content that appears on the page displayed to the user.

A YP List Background field 1435 includes the name of a graphics image format file to use as a document's background. For example, a solid color, or some other appealing pattern or design, could be used and stored in a conventional graphic image format.

A YP list HREF field 1440 contains the URL preface to use whenever a URL references HREF. A YP list GEO field 1445 includes the URL preface to use whenever a URL references the geographic database 210. Finally, a YP list YP field 1450 includes the URL preface used whenever a URL references the yellow pages database 245.

It should be noted that although data stored within the YPLD configuration database 328 may include any one of the fields 1400 through 1450 described above, in practice, not all of these fields are used in each application. More specifically, in one preferred embodiment, when data from the geographic database 210 is merged with the YPLD configuration document, only the fields 1400, 1425, 1430 and 1435 of the YPLD configuration database 328 are used. when the YPLD configuration document is used in conjunction with the local content database 230, all of the fields are used, with the exception of the fields 1405 through 1420. Similarly, each of the fields within the YPLD configuration document are used, with the exception of fields 1440 through 1450, when the YPLD configuration file is merged with data provided by the yellow pages database 245.

FIG. 15 illustrates an exemplary display which may be presented to the user when the user accesses a geographic location within the geographic database 210 having anchors which allow the user to access topics from the displayed HTML document. The screen display depicted in FIG. 15 might, for example, be the screen display presented to the user after the user activates the connection button 920 within the screen display of FIG. 9.

As depicted in FIG. 15, the screen display includes a database title and view area 1505 which includes text from the YP list logo field 1425 (FIG. 14). In the example shown in FIG. 15, the database title is "North American Database1" and the view is "city." A display region 1515 includes a short description text which corresponds to the text stored within the description field 1325 (FIG. 13).

A graphic display 1520 comprises a plurality of icons 1525, 1528, etc. and corresponds to the graphics image format (GIF) file stored within the maps field 1340 of data stored within the geographic database 210. As discussed briefly above, the graphic image 1520 may serve as a bridge between the geographic and local content information. That is, topical information may be accessed via the graphic image 1520, while the graphic image 1520 is associated with a particular geographic location, such as the City of Los Angeles. In order to access topical information, the user may position a mouse pointer over one of the icons and click the mouse button. For example, if the display of FIG. 15, if the user wishes to obtain information about schools, the user would position the mouse pointer over the school icon 1525 and depress the mouse button, while if the user was interested in obtaining information about entertainment, the user would position the mouse pointer over the entertainment icon 1528 and depress the mouse button, etc. In this manner, a seamless interface may be provided between topical and geographic information to provide a seamless search method which bridges between the geographic and topical information in an intuitive and easy-to-use manner.

The display of FIG. 15 further includes an entry display field 1530 which includes the text stored within the field 1310 of FIG. 13, and a bullet display logo 1535 which is taken from the graphics image format file designated within the bullet field 1320 (e.g., a yellow ball). A list of related entries 1540 is also shown in FIG. 15, and this list is derived from the text stored within the label field 1315 of FIG. 13 and from the Dbview parameter specified in the search command. As depicted in FIG. 15, the related fields follow the chain of geographic areas hierarchically back to the most universal area (i.e., North America in this case).

Each of the underlined listings serve as anchors which generate a search request when activated by the user. For example, the entry "Points of Interest for Los Angeles" generates a call to the geographical search engine 315. The URL for this anchor is generated using the DBview parameter (i.e., associated with the search command for the geographical search engine 315) and the NameKey for the city (i.e., the city of Los Angeles in this example). Since the anchor lists the points of interest for the whole city of Los Angeles (as indicated by the suffix "for Los Angeles"), this indicates that the DBview parameter used to generate the URL includes a numerical designation (i.e., POI50) to indicate to the geographical search engine 315 that a list of entries is to be generated in response to the activation of this anchor. In like manner, the entry "Southern California" generates a call to the geographical search engine 315. The URL for this anchor is generated using the DBview parameter (i.e., associated with the search command for the geographical search engine 315) and the NameKey for the region (i.e., the region of Southern California in this example). In this case, however, the DBview parameter is simply "REGION" since the anchor does not designate an entire list of entries. Similarly, the entry "California" generates a call to the geographical search engine 315. The URL for this anchor is generated using the DBview parameter (i.e., associated with the search command for the geographical search engine 315) and the NameKey for the state (i.e., the state of California in this example). In this case, the DBview parameter is simply "SPT" since the anchor does not designate an entire list of entries. A like method is used to generate each of the anchors listed within the list of related entries 1540.

A pair of standard buttons are displayed as logos 1550. These buttons 1550 are standard HTML anchors and the reference to these files (i.e., which indicates where the graphics image format file used to generate these logos is stored) is hard-coded into the search engine executable file.

Finally, comments and other footer information are displayed within a footer region 1560 of the screen display. The text which is displayed within the region 1560 is taken from the YP list credits field 1430 of FIG. 14.

Local Content Databases

FIG. 16 schematically illustrates the format of data stored within the local content database 230. Sample entries to the local content database 230 are included in Table 8. As depicted in FIG. 16, the data within the local content database 230 includes a folder name header field 1600 which provides the key or index under which all of the subentries for this entry will be stored. The folder name should be unique within the database. For this reason, in a preferred embodiment, the folder name is automatically generated. During the folder creation process, the folder name for the parent entry is provided. In one embodiment, once the folder name has been established, it should not be changed, because subentries contain a reference to this folder name as their parent folder. Thus, modifying the folder name would entail modifying each of the subentries beneath that folder name as well.

The data within the local content database 230 further includes a parent folder name field 1610. This field provides the key to displaying related entries to the user. When a user requests a list of the contents of a folder, the name of a folder which is to be searched is provided by the user (i.e., via the Read subroutine 320). The database returns a list of all the names whose parent folder name matches the requested name. The parent folder name field is automatically inherited from the parent entry. Like the folder name, the parent folder name should not be changed.

A title field 1620 includes a text which is shown to the user as the descriptor for this particular entry. That is, when this entry is called up by the user by accessing a listed topic (e.g., by clicking over one of the icons displayed in FIG. 15), the text within the title field 1620 is displayed to the user on the display screen at the user's terminal. Like the folder name the title field should not be changed.

A parent title field 1630 includes text which is shown as the folder title to the user for this entry. This field is automatically inherited from the parent entry so that the title of the folder is automatically displayed to the user whenever the user accesses a subtopic entry related to the parent topic.

A bullet field 1640 is substantially the same as the bullet field 1320 of FIG. 13. In particular, a small yellow ball, or other simple logo, will be displayed next to an entry's title. If some other graphic is to be displayed, the name of the graphics file will be entered within the field 1640.

Finally, a URL field 1650 includes a path name which defines the URL location to which the user is to be sent whenever this title is activated from the Netscape Browser program run on the Netscape server. A plurality of different entries may be entered within the URL field 1650. For example, the URL field 1650 may be left blank, in which case the user is shown a list of the subentries to this entry. That is, when the URL field is left blank, this is an indication that a final destination has not yet been reached. Thus, this implies that the sub-category related to the current topic should be brought up. In another case, a URL can be entered within the URL field 1650, in which case the user is sent to the address corresponding to that URL. In one embodiment, spaces in the URL parameter field are replaced by underscores to facilitate NETSCAPE server processing (activity block 820 in FIG. 8).

Alternatively, different keywords such as the HREF keyword, the YP keyword, the GEO keyword or the NOTE keyword, could be specified within the URL field 1650 which will send the user to the database corresponding to that keyword. For example, if the YP (i.e., yellow pages) keyword is entered (e.g., YP:SCHOOL), a yellow page reference to the keyword "school" will be generated. Like references will be generated in the event that the keyword is a HERF, a GEO, or a NOTE keyword.

When HREF:, GEO: and YP: keywords are used, text follows the colon. This text is appended to the configured value to complete a URL. The intent of these keywords is to provided a generic capability for the local content database 230 so that the same list structure can be used to reference many different data sources. For instance, instead of hard-coding the reference to a yellow page directory search, the publisher can simply enter YP:SCHOOL to cause a configured value to be used for references to the yellow pages database 245. Now the same list can be used without modifications to reference a second database by simply using a different configuration in the yellow pages search command.

YELLOW PAGES DATABASE

FIG. 17 schematically depicts the format of data as stored within the yellow pages database 245. Sample entries to the yellow pages database 245 are included as Table 9. An expiration date field 1700 includes the date or dates that this listing expires, while a name field 1705 includes, in text form, the name to be shown on the listing. Address and city fields 1710, 1715, respectively show the street address to be shown on the listing and the city name. In addition, a state field 1720 as well as a zip code field 1725, respectively, include the state name and the postal or zip code of the listing.

Phone and fax fields 1730, 1735, respectively, include the phone number of the listing to be displayed to the user and the facsimile phone number for the same listing.

A skeleton HTML field 1740 includes the name of a file containing the HTML text to use for publishing. In addition to the standard HTML tags, extended tags can be used within the skeleton HTML file 750. As is well known in the art, an HTML tag is a segment of script code which calls a particular function to be performed. Typically, a tag is a kind of identifier that identifies an element of the HTML document (e.g., a heading or list) so that the HTTP browser is told how to display the element. The extended tags constitute a specially defined HTML function, and will be described in greater detail below with reference to FIG. 20. The default skeleton field HTML is used when the skeleton HTML field 1740 is left blank.

An E-mail field 1745 includes the electronic mail address to be shown on the listing. If no E-mail address is to be shown on the listing, then this field is left blank.

A bullet field 1750 is substantially similar to the bullet fields 1320, 1640 described above. As discussed above, normally a yellow ball will be displayed next to an entry's title. If some other graphic is to be displayed, then the name of that graphics image format file is entered into this field. Usually, this will be one of the generic images stored on the server.

A URL field 1755 defines the URL location to which the user is to be sent whenever this title is activated from the Netscape browser. If the URL field 1755 is left blank, the user is shown a list of the subentries to this entry. In addition, a URL could be entered within the URL field 1755 in which case the user is sent to the designated URL.

A button count field 1760 includes information defining the number of URL buttons defined for this entry. A label URL field 1765, a listing URL field 1770, and an image URL field 1775, respectively contain information specifying the text label of the URL button X (where X is a number between 1 and button count), the URL reference for the URL button X, and a graphic image label of the URL button X.

An SIC code field 1780 includes the listing (standardized industry code) SIC coding. A keywords field 1785 includes a comma separated list of keywords with which this entry can be listed. An extended price field 1790, although not used within one actual embodiment, is reserved for the price which the publisher charges an advertiser (e.g., for billing purposes). Finally, a description field 1795 includes text notations which are displayed to the user on the HTML document.

It should be noted that, although the fields described above are the standardly defined fields in one actual embodiment, other fields could be defined by each publisher as called for by the specific application.

FIG. 19 schematically depicts the format of data contained within the notes portion of the yellow pages database 245. Specifically, as depicted in FIG. 19, an HTML field 1910 includes information defining the name of the HTML skeleton file. That is, as described briefly above, whenever the HTML document is generated by the notes.exe search engine 720, the data within the notes portion of the yellow pages database 245 is merged with a file format configuration document found within the HTML skeleton database 750. Since the HTML skeleton document has a variable format which is dependent upon the data stored within the notes portion of the yellow pages database 245, it is important for each set of stored data, that the appropriate HTML skeleton file be designated as a header with the data so that the data will be shown in the appropriate format to the user on the display screen. The HTML skeleton file should be specified as a complete path name.

A button count field 1920 includes information specifying the number of URL buttons defined for this entry. That is, the number of buttons defined for this entry by which the user may hyper-link to another document.

A label URL field 1930, a listing URL field 1940, and an image URL field 1950, respectively, specify the text label of the URL button X (where X is a number between 1 and button count), the URL reference for the URL button X, and the graphic image label for the URL button X. Finally, other fields which a user desires to publish may also be included in the other fields 1960 of the notes portion of the yellow page database 245. For example, if it is desired to provide a graphic image as part of the advertisement or other information such as directions, a map, or other information which is desired to be presented to the user, each of these may be included as separate fields within the other fields 1960.

Note Skeleton HTML File Extended HTML TAGS

FIG. 20 is a table which lists the configuration of the specially defined extended HTML tags incorporated as part of the preferred embodiment. The defined functions associated with the extended tags are stored within the HTML skeleton file 750. As discussed briefly above, the generated HTML documents are significantly different since the files are dynamically created rather than formed in a static format. That is, rather than coding the text of an HTML document as a set template, the HTML code includes extended tags which typically are defined to call sophisticated functions depending upon the actual data which is provided for input to the HTML skeleton files from the database entry. Thus, the format of the HTML files will vary as a function of the requested entry's data which is provided for input to the HTML skeleton files. In this manner, the note search engine 730 dynamically constructs the HTML document in accordance with the data parameters.

A first extended tag, depicted in FIG. 20, is an include tag 2005 which receives the file name as a parameter. The script form of the extended tag is: "<!-#INCLUDE filename->." When this extended tag is incorporated into an HTML document, and the HTML document is translated by the note search engine 730, the file (having the file name indicated by the parameter filename) is then included within the displayed HTML document. An insert extended tag 2010 receives data in a text format as a parameter, and this text is then inserted into the HTML document as a tag. The script form of this extended tag is: "<!-#INSERTZLANDTAG text->."

An anchor extended tag 2015 receives up to three parameters to define anchors within the HTML document. The script form of this extended tag is: "<!-ANCHOR href text image->." The parameters href, text, and image designate field names within the yellow page database entry. The contents of these fields are then used to define the anchor. More specifically, the href parameter designates the name of a field which includes information that indicates where the user will go when the user activates the anchor (i.e., the URL location to which the user is sent when the user activates this anchor). The text parameter designates a field which contains the text for the anchor, and the image parameter designates a graphical image field which includes the image associated with the anchor. It should be noted that typically the anchor will be defined either by text or an image, although it is possible to reference the same anchor using both text and an image. Thus, if the text parameter is not passed, then no text is used for the anchor, while if the image parameter is not passed, this means that no graphic image is displayed as an anchor.

A button extended tag 2020 receives a number as a parameter. The script form of this extended tag is: "<!-BUTTON number->." The button extended tag 2020 uses the three database fields 1930, 1940, and 1950, as well as the button count field 1920 (see FIG. 19) to define the button to be inserted into the document.

A columns extended tag 2025 receives two parameters including a number n and a file name. The script form of this extended tag is: "<!-COLUMNS n filename->." Using these two parameters, a menu of directory entries are created from the directories listed in the file designated by the file name parameter. The columns extended tag is particularly suited for applications where the publisher wishes to define a set of menu entries contained as a group of subdirectories on the file screen. Thus, according to this application, the columns extended tag does not generate database calls. Rather, the menu entries are defined in accordance with the specifications of the file server operating system.

Entries are listed in three columns of 28 characters each in one preferred embodiment. The named file advantageously contains one line for each directory, and each directory entry lists the directory of n characters, followed on the same line by the text title for the menu entry. That is, the parameter n specifies the character length of the directory path name. If this directory does not exist, it will be created. In the case where the directory does not exist, the anchor points to a default file in the specified directory.

A field extended tag 2030 inserts the contents of the field designated by a parameter fieldname into the HTML document. As is well known in the art, records stored within a database format typically include one or more fields, wherein each field is given a name so that the field is independently accessible. Thus, the name of the field which is to be incorporated into the HTML document is passed as the fieldname parameter. The script form of the field extended tag is: "<!-FIELD fieldname->."

A menu extended tag 2035 receives the file name and an integer n as parameters, and causes a menu of directory entries to be created from the directories listed in the document designated by the file name parameter. The script form of the menu extended tag is: "<!-MENU n filename->." The parameter n specifies the character length of the directory path name as discussed above.

Finally, a URL extended tag 2040 receives an integer n and a file name as parameters, and creates a menu of URL entries from the URLs listed in the file designated by the file name parameter. The script form of the extended tag is: "<!-URL n filename->." The named file contains one line for each URL and each URL entry lists the URL of n characters followed by the text title for the menu entry. If the URL does not exist, then it will be created. The parameter n specifies, in integer form, the character length of the passed URL name.

It should be noted here that the teachings of the preferred embodiment need not be limited to actual world geographic areas. For example, in one embodiment, a similar system could be used in a virtual (e.g., an imaginary or arbitrarily constructed) geography, wherein topical information about fictional geographic areas could be accessed. Such an implementation might have application in gaming or role playing environments as well as in computer simulation environments.

Although the preferred embodiment of the present invention has been described in detail above, it will be appreciated by those of ordinary skill in the art that several obvious modifications could be made to the above-described invention without departing from its spirit or essential characteristics. For example, in addition to the Internet, the preferred embodiment could be incorporated into a centralized system, or host-based system, such as American On-Line, Compuserve, etc. Additionaly, the particular geographical divisions used to define the geography database 210 could be altered based upon the particular application of the invention. Furthermore, the particular formats of information stored within each database may vary as called for by the particular implementation of the invention. For example, a publisher may wish to modify the template defined in the YPLD configuration database. Additionally, other extended tags might be defined as needed for the convenience of the publisher. Therefore, the foregoing description should be considered as illustrative and not restrictive, so that the scope of the invention should be interpreted in light of the following appended claims.

TABLE 1

Content-type: text/html
<HTML><HEAD><TITLE>Irvine Directory:</TITLE></HEAD><body background="/gifs/rock1.gif">
<p><hr><center><H1>Alderwood Basic Plus</H1></center><hr></p><center><B>Alderwood Basic
Plus</B><br>22 Alderwood<br>Irvine, CA <br><br>Phone:<B>714-559-6754 </B> Fax: <B></B>
<br><br>Electronic Mail Address: <B></B><br><br><br></center><p><a href ="/guides/default.
htm"><img src="/gifs/guides.gif" align=middle hspace=10 border=0 alt="Guided Tours"></a><a
href="/default.htm"><img src="/gifs/zbutton.gif"align=middle hspace=10 border=0 alt="Z
Land"></a></p><IMG SRC="/Lines/eyes.gif" alt=" "><p>Send your letters and comments to: <a
href="mailto:webeditor@mail.zland.com">webeditor@mail.zland.com </a><br><br></p>Copyright
© 1995 Z Land, LLC. All rights reserved.</BODY></HTML>

TABLE 2

Content-type: text/html
<HTML><HEAD><TITLE>Irvine Directory KeywordListing:Secondary_\&_Elementary</TITLE></HEAD>
<body background="/gifs/rock1.gif"><center><B>Irvine Directory</B><br><B>KeywordListing
</B></center><br><DL><DT><IMG SRC="/icons/folder_open.gif" hspace=10   border=0>  <B>Secondary
& Elementary</B><a href="/search/yp2?na\us\ca\sc\ir\cityyp+STDYP+Keyword Listing+25+
Secondary_&_Elementary"> (25 of 28) </a><DD><DL><DT><IMG SRC=/Bullets/yellow.gif hspace=10
border=0   ALT="?"><a href="/search/note?na\us\ca\sc\ir\cityyp+8738">Alderwood Basic Plus
</a>714-559-6754 <DD>22 Alderwood Irvine </DL><DD><DL><DT><IMG SRC =/Bullets/yellow.gif
hspace=10   border=0   ALT="?"><a href="/search/note?na\us\ca\sc\ir\ cityyp+8742">Bonita Canyon
</a>714-854-8111 <DD>1 Sundance Rd. Irvine </DL><DD><DL><DT> <IMG SRC=/Bullets/yellow.gif
hspace=10   border=0   ALT="?"><a href="/search/note?na\us\ca\sc\ir\ cityyp+8746">Brywood
</a>714-857-9230 <DD>1 Westwood Irvine </DL><DD><DL><DT><IMG SRC=/Bullets/yellow.gif
hspace=10   border=0   ALT="?"><a href="/search/note?na\us\ca\sc\ir\ cityyp+8750">College Park
</a>714-551-3871 <DD>3700 Chaparrel Irvine </DL><DD><DL><DT><IMG SRC=/Bullets/yellow.gif
hspace=10   border=0   ALT="?"><a href="/search/note?na\us\ca\sc\ir\ cityyp+8754">Culverdale
</a>714-786-3008 <DD>2 Paseo Westpark Irvine </DL><DD><DL><DT><IMG SRC=/Bullets/yellow.gif
hspace=10   border=0   ALT="?"><a href="/search/note?na\us\ca\sc\ir\ cityyp+8758">Deerfield
</a>714-559-0100 <DD>2 Deerfield Irvine </DL><DD><DL><DT><IMG SRC=/Bullets/yellow.gif
hspace=10   border=0   ALT="?"><a href="/search/note?na\us\ca\sc\ir\ cityyp+8762">Eastshore
</a>714-552-7228 <DD>155 Eastshore Irvine </DL><DD><DL><DT><IMG SRC=/Bullets/yellow.gif
hspace=10   border=0   ALT="?"><a href="*/search/note?na\us\ca\sc\ir\ cityyp+8766">El Toro Marine
</a>714-552-7228 <DD>8171 Trabuco Rd. Irvine </DL><DD><DL><DT><IMG SRC=/Bullets/yellow.gif
hspace=10   border=0   ALT="?"><a href="/search/note?na\us\ca\sc\ir\ cityyp+8770">Greentree
</a>714-551-2301 <DD>4200 Manzanita Irvine </DL><DD><DL><DT><IMG SRC=/Bullets/yellow.gif
hspace=10   border=0   ALT="?"><a href="/search/note?na\us\ca\sc\ir\ cityyp+8814">Irvine High
</a>714-552-4211 <DD>4321 Walnut Ave. Irvine </DL><DD><DL><DT><IMG SRC=/Bullets/yellow.gif
hspace=10   border=0   ALT="?"><a href="/search/note?na\us\ca\sc\ir\ cityyp+9098">Irvine Unified
School District </a>714-651-0444 <DD>5050 Barranca Pkwy. Irvine </DL><DD><DL><DT><IMG TABLE 2-continued SRC=/Bullets/yellow.gif hspace=10 border=0 ALT="?"><a href="/search/note?na\us\ca\sc\ir\ cityyp+8810">Lakeside Middle </a>714-559-1601 <DD>3 Lemon Grass Irvine </DL><DD><DL><DT><IMG SRC=/Bullets/yellow.gif hspace=10 border=0 ALT="?"><a href="/search/note?na\us\ca\sc\ir\ cityyp+8774">Los Naranjos </a>714-552-5171 <DD>1 Smoke Tree Ln. Irvine </DL><DD><DL><DT><IMG SRC=/Bullets/yellow.gif hspace=10 border=0 ALT="?"><a href="/search/note?na\us\ca\sc\ir\ cityyp+8778">Meadow Park </a>714-786-0121 <DD>50 Blue Lake South Irvine </DL><DD><DL><DT> <IMG SRC=/Bullets/yellow.gif hspace=10 border=0 ALT="?"><a href="/search/note?na\us\ca\sc\ir\ cityyp+8782">Northwood </a>714-551-8567 <DD>28 Cars on Irvine </DL><DD><DL><DT><IMG SRC=/Bullets/yellow.gif hspace=10 border=0 ALT="?"><a href="/search/note?na\us\ca\sc\ir\ cityyp+8822">Rancho San Joaquin Middle </a>714-786-3005 <DD>4861 Michaelson Dr. Irvine </DL><DD><DL><DT><IMG SRC=/Bullets/yellow.gif hspace=10 border=0 ALT="?"><a href="/search/note?na\us\ca\sc\ir\ cityyp+8818">San Joaquin High </a>714-857-2682 <DD>311 W Yale Loop Irvine </DL><DD><DL><DT><IMG SRC=/Bullets/yellow.gif hspace=10 border=0 ALT="?"><a href="/search/note?na\us\ca\sc\ir\ cityyp+8786">Santiago Hills </a>714-544-5362 <DD>29 Christamon West Irvine </DL><DD><DL><DT><IMG SRC=/Bullets/yellow.gif hspace=10 border=0 ALT="?"><a href="/search/note?na\us\ca\sc\ir\ cityyp+8826">SELF Alternative High School </a>714-786-5190 <DD>311 W Yale Loop Irvine </DL><DD><DL><DT><IMG SRC=/Bullets/yellow.gif hspace=10 border=0 ALT="?"><a href="/search/note?na\us\ca\sc\ir\ cityyp+8830">Sierra Vista Middle </a>714-838-5440 <DD>2 Liberty Irvine </DL><DD><DL><DT><IMG SRC=/Bullets/yellow.gif hspace=10 border=0 ALT="?"><a href="/search/note?na\us\ca\sc\ir\ cityyp+8834">South Lake Middle </a>714-726-8600 <DD>655 W Yale Loop Irvine </DL><DD><DL><DT><IMG SRC=/Bullets/ yellow.gif hspace=10 border=0 ALT="?"><a href="/search/note?na\us\ca\sc\ir\ cityyp+8790"> Springbrook </a>714-522-6623 <DD>655 Springbrook North Irvine </DL><DD><DL><DT><IMG SRC=/Bullets/yellow.gif hspace=10 border=0 ALT="?"><a href="/search/note?na\us\ca\sc\ ir\ cityyp+8794">Stone Creek </a>714-551-1201 <DD>2 Stone Creek South Irvine</DL><DD><DL> <DT>IMG SRC=/Bullets/yellow.gif hspace=10 border=0 ALT="?"><a href="/search/note?na\us\ ca\sc\ir\ cityp+8798">Turtle Rock</a>714-854-7002 <DD>5151 Amalfi Dr. Irvine </DL><DD><DL><DT><IMG SRC=/Bullets/yellow.gif hspace=10 border=0 ALT="?"><a href="/ search/note?na\us\ca\sc\ir\ cityyp+8838">University High</a>714-854-7500 <DD>4771 Campus Dr. Irvine </DL><br></DL><center> <IMG SRC="/icons/magnify1.gif" alt=" " hspace=10 border=0><a href="/search/yp2?na\us\ca\sc\ir\ cityyp+STDYP+KeywordListing+25+Secondary_&_Elementary"> More from all folders...</a></center><p><a href="/guides/default.htm"><"/gifs/guides.gif" align=middle hspace=10 border=0 alt="Guided Tours"></a><a href= "/default.htm"> <img src="/gifs/zbutton.gif" align=middle hspace=10 border=0 alt="Z Land"></a></p><IMG SRC="/Lines/eyes.gif" alt=" "><p>Send your letters and comments to: <a href="mailto: webeditor@mail.zland.com">webeditor@mail.zland.com</a><br><br></p>Copyright © 1995 Z Land, LLC..All rights reserved.</BODY></HTML>

TABLE 3

Content-type: text/html
<HTML><HEAD><TITLE>City of Irvine, CA:City1.6.3</TITLE></HEAD><body background="/gifs /rock1.gif"><center><B>City of Irvine, CA</B> <br><B>Folders</B></center><br><DL><DT><IMG SRC="/icons/folder_open.gif" hspace=10 border=0> <B>School Listing</B> (3 of 3) <DD><IMG SRC=/Bullets/yellow.gif hspace=10 border=0 ALT=" "> <a HREF="/search/yp2?na\us\ca\ sc\ir\cityyp+STDYP+KeywordListing+0+Colleges_&_Universities"> Colleges & Universities</a> <DD><IMG SRC=/Bullets/yellow.gif hspace=10 border=0 ALT=" "> <a HREF="/search/yp2?na\us\ca\ sc\ir\cityyp+STDYP+KeywordListing+0+Preschool_&_Kindergarten"> Preschool & Kindergarten</a> <DD><IMG SRC=/Bullets/yellow.gif hspace=10 border=0 ALT=" "> <a HREF="/search/yp2?na\us\ca\ sc\ir\cityyp+STDYP+KeywordListing+0+Secondary_&_Elementary">Secondary & Elementary </a><br> </DL> <p><a href="/guides/default.htm"> <img src="/gifs/guides.gif" align=middle hspace=10 border=0 alt="Guided Tours"></a> <a href="/default.htm"> <img src="/gifs/zbutton.gif" align=middle hspace=10 border=0 alt="Z Land"></a></p> <IMG SRC="/Lines/eyes.gif" alt=" "> <p>Send your letters and comments to: <a href="mailto:webeditor@mail.zland.com">webeditor@ mail.zland.com</a><br><br></p> Copyright © 1995 Z Land, LLC. All rights reserved.
</BODY>
</HTML>

TABLE 4

Content-type: text/html
<HTML><HEAD>
<TITLE>North American Database1:NA.US.CA.SC.IR</TITLE></HEAD>
<body background="/gifs/rock1.gif"><center>
<B>North American Database1</B><br><B>CITY</B></center><br><DL>
<center><H1>Welcome to Irvine</H1></center>
<p>Whether you're here to live, work or play, we hope your stay in our city is prosperous and enjoyable.</p><p>Our city is really many smaller communities that share diverse cultures and lifestyles. </p>
<center><a href=/cgi-bin/imagemap/~ImageMaps/NA.US.CA.SC.IR.CITY.LC.map>
<img src="/ImageMaps/ourtown.gif" border=0 ISMAP alt="Our Town"></a>

TABLE 4-continued

```
</center>
<DD><IMG SRC=/Bullets/yellow.gif hspace=10 border=0 ALT=" "> Irvine<br>
<DL><DD><a href="/search/geo1?geograph/NA1+GeoLst+PO150+0+NA.US.CA.SC.IR">
Points of Interest for Irvine</a>
<DD><a href="/search/geo1?geograph/NA1+RegionDtl+REGION+ +NA.US.CA.SC">
Southern California</a>
<DD><a href="/search/geo1?geograph/NA1+SPTDtl+SPT+0+NA.US.CA"> California</a>
<DD><a href="/search/geo1?geograph/NA1+CountryDtl+COUNTRY+0+NA.US">
United States</a><DD><a href="/search/geo1?geograph/NA1+ContinentDtl+CONTINENT+0+
NA">
North America</a>
<DD><DL></DL></DL><br><br></DL>
<p><a href="/guides/default.htm"><img src="/gifs/guides.gif" align=middle
hspace=10 border=0 alt="41 Guided Tours"></a>
<a href="/default.htm"><img src="/gifs/zbutton.gif" align=middle
hspace=10 border=0 alt="Z Land"></a></p>IMG SRC="/Lines/eyes.gif" alt=" ">
<p>Send your letters and comments to:
<a href="mailto:webeditor@mail.zland.com">webeditor@mail.zland.com</a><br><br></p>
Copyright © 1995 Z Land, LLC. All rights reserved.</BODY></HTML>
```

TABLE 5

```
<body background="/gifs/rock1.gif">
<p><hr><center><H1>
<!--FIELD Name -->
</H1></center><hr></p>
<center><B>
<!--FIELD Name -->
</B><br>
<!--FIELD Address -->
<br>
<!--FIELD City -->
,
<!--FIELD State -->
.
<!--FIELD Zipcode -->
<br><br>Phone:<B>
<!--FIELD Work -->
</B> Fax: <B>
<!--FIELD Fax -->
</B><br>Electronic Mail Address: <B>
<!--FIELD EMail -->
<!--ANCHOR ListingURL LabelURL -->
<br>
</center>
```

TABLE 6

Yellow Page Listing Descriptor

| | |
|---|---|
| YPListName: | STDYP |
| YPListFormula: | @All |
| YPListFields: | Name, [], Work, Address, City |
| YPListPrint: | -, -, -, <DD>, - |
| YPListField Logos: | |
| YPListLogo: | |
| YPListCredits: | |
| YPListBack: | /gifs/rock1.gif |
| YPListHREF: | /search/yp2?HB/YP+STDYP+KEY+0 |
| YPListGEO: | search/geo1?geograph>eo1 |
| YPListYP: | /search/yp2?HB/YP+STDYP+KEY+0 |
| Edit New Descriptor | Done |

TABLE 7

Continent Record

| | |
|---|---|
| NameKey: | AF |
| Bullet: | |
| Title: | Africa |
| | _Description_ |
| | _URLs For Listing_ |
| | |
| | _Cross References_ |
| Maps: | Earth |
| URLHostName: | Continent Record |
| URLDBName: | |
| RWorld: | |
| NameKey: | AN |
| Bullet: | |
| Title: | Antarctica |
| | _Description_ |
| | _URLs For Listing_ |
| Maps: | |
| URLHostName: | |
| URLDBName: | _Cross References_ |
| RWorld: | Earth |
| | Continent Record |
| NameKey: | AS |
| Bullet: | |
| Title: | Asia |
| | _Description_ |
| | _URLs For Listing_ |
| Maps: | |
| URLHostName: | |
| URLDBName: | _Cross References_ |
| RWorld: | Earth |
| | Continent Record |
| NameKey: | AU |
| Bullet: | |
| Title: | Australia |
| | _Description_ |
| | _URLs For Listing_ |
| Maps: | |
| URLHostName: | |
| URLDBName: | _Cross References_ |
| RWorld: | Earth |
| | Continent Record |
| NameKey: | EU |
| Bullet: | |
| Title: | Europe |
| | _Description_ |
| | _URLs For Listing_ |
| Maps: | |
| URLHostName: | |
| URLDBName: | |

TABLE 7-continued

```
                    _Cross References_
RWorld:             Earth
                       Continent Record NameKey:            NA
Bullet:
Title:              North America
                    _Description_
                    _URLs For Listing_
Maps:
URLHostName:
URLDBName:
                    _Cross References_
RWorld:             Earth
                       Country Record NameKey:            NA.CA
Bullet:
Title:              Canada
                    _Description_
                    _Cross References_
Maps:
URLHostName:
URLDBName:
                    _URLs For Listing_
LContinent:         North America
                    _Cross References_
RContinent:         NA
                       Country Record NameKey:            NA.MX
Bullet:
Title:              Mexico
                    _Description_
                    _Cross References_
Maps:
URLHostName:
URLDBName:
                    _URLs For Listing_
LContinent:         North America
                    _Cross References_
RContinent:         NA
                       Country Record NameKey:            NA.US.
Bullet:
Title:              United States
                    _Description_
                    _Cross References_
Maps:
URLHostName:
URLDBName:
                    _URLs For Listing_
LContinent:         North America
                    _Cross References_
RContinent:         NA
                       SPT Record NameKey:            NA.US.CA
Bullet:
Title:              California
                    _Description_
                    _URLs For Listing_
Maps:
URLHostName:
URLDBName:
                    _Labels_
LCountry:           United States
LContinent:         North America
                    _Cross References_
RCountry:           NA.US
RContinent:         NA
                       Region Record NameKey:            NA.US.CA.NC
Bullet:
Title:              Northern California
                    _Description_
                    _URLs For Listing_
```

TABLE 7-continued

```
Maps:
URLHostName:
URLDBName:
                    _Labels_
LSPT:               California
LCountry:           United States
LContinent:         North America
                    _Cross References_
RSPT:               NA.US.CA
RCountry:           NA.US
RContinent:         NA
                       Region Record NameKey:            NA.US.CA.SC
Bullet:
Title:              Southern California
                    _Description_
Southern California is the land of sun, golf and beaches galore.<br><br>
                    _URLs For Listing_
Maps:
URLHostName:
URLDBName:
                    _Labels_
LSPT:               California
LCountry:           United States
LContinent:         North America
                    _Cross References_
RSPT:               NA.US.CA
RCountry:           NA.US
RContinent:         NA
                       City Record NameKey:            NA.US.CA.SC.HB
Bullet:
Title:              Huntington Beach
                    _Description_
                    _URLs For Listing_
Maps:
URLHostName:
URLDBName:
                    _Labels_
LRegion:            Southern California
LSPT:               California
LCountry:           United States
LContinent:         North America
                    _Cross References_
RRegion:            NA.US.CA.SC
RSPT:               NA.US.CA
RCountry:           NA.US
RContinent:         NA
                       City Record NameKey:            NA.US.CA.SC.IR
Bullet:
Title:              Irvine
                    _Description_
<center><H1>Welcome to Irvine</H1></center><p>Whether you're
here to live, work or play, we hope your stay in our city is prosperous and
enjoyable.</p><p>Our city is really many smaller communities
that share diverse cultures and lifestyles. </p>
                    _URLs For Listing_
                    OURTOWN:NA.US.CA.SC.IR.CITYLC
Maps:
URLHostName:
URLDBName:
                    _Labels_
LRegion:            Southern California
LSPT:               California
LCountry:           United States
LContinent:         North America
                    _Cross References_
RRegion:            NA.US.CA.SC
RSPT:               NA.US.CA
RCountry:           NA.US
RContinent:         NA
                       City Record NameKey:            NA.US.CA.SC.LA
Bullet:
```

TABLE 7-continued

| | |
|---|---|
| Title: | Los Angeles |
| | _Description_ |
| <center><H1>Welcome to Los Angeles</H1><1center><p>Whether you're here to live, work or play, we hope your stay in our city is prosperous and enjoyable.</p><p>Our city is really many smaller communities that share diverse cultures and lifestyles. </p> | |
| | _URLs For Listing_ |
| | OURTOWN:NA.US.CA.SC.LA.CITYLC |
| Maps: | |
| URLHostName: | |
| URLDBName: | |
| | _Labels_ |
| LRegion: | Southern California |
| LSPT: | California |
| LCountry: | United States |
| LContinent: | North America |
| | _Cross References_ |
| RRegion: | NA.US.CA.SC |
| RSPT: | NA.US.CA |
| RCountry: | NA.US |
| RContinent: | NA |
| | POI Record |
| NameKey: | NA.US.CA.SC.LA.Disney |
| Bullet: | |
| Title: | Disneyland |
| | _Description_ |
| World famous as the happiest place on Earth. | |
| | _URLs For Listing_ |
| Maps: | |
| URLHostName: | |
| URLDBName: | |
| | _Labels_ |
| LCity: | Los Angeles |
| LRegion: | Southern California |
| LSPT: | California |
| LCountry: | United States |
| LContinent: | North America |
| | _Cross References_ |
| RCity: | NA.US.CA.SC.LA |
| RRegion: | NA.US.CA.SC |
| RSPT: | NA.US.CA |
| RCountry: | NA.US |
| RContinent: | NA |

TABLE 8

Local Content List Record

| | |
|---|---|
| List Name: | City |
| Folder Name: | City1 |
| Title: | Consumer1 |
| Bullet: | |
| URL: | |
| | _Description_ |

Local Content List Category Record

| | |
|---|---|
| Parent Folder Name: | City |
| Parent Folder Title: | City1 |
| Folder Name: | City.1 |
| Title: | Government |
| Bullet: | |
| URL: | |
| | _Description_ |

Local Content List SubCategory Record

| | |
|---|---|
| Parent Folder Name: | City.1 |
| Parent Folder Title: | Government |
| Folder Name: | City1.1.2 |
| Title: | County |
| Bullet: | |
| URL: | |
| | _Description_ |

Local Content List SubCategory Record

| | |
|---|---|
| Parent Folder Name: | City1.1.2 |
| Parent Folder Title: | County |
| Folder Name: | City1.1.2.1.1 |
| Title: | Adoption |
| Bullet: | |
| URL: | |
| | _Description_ |

TABLE 8-continued

Local Content List Category Record

| | |
|---|---|
| Parent Folder Name: | City1 |
| Parent Folder Title: | City |
| Folder Name: | City1.6 |
| Title: | Our Town |
| Bullet: | |
| URL: | |

_Description_

Local Content List SubCategory Record

| | |
|---|---|
| Parent Folder Name: | City.6 |
| Parent Folder Title: | OurTown |
| Folder Name: | City1.6.2 |
| Title: | Directories |
| Bullet: | |
| URLURL: | http://www.zland.com/search/1c?NA/US/CA/SC/LA/CITYLC+GeoLst+Folders+0+City1.5 |

_Description_

Local Content List SubCategory Record

| | |
|---|---|
| Parent Folder Name: | City1.6 |
| Parent Folder Title: | OurTown |
| Folder Name: | City1.6.3 |
| Title: | School Listing |
| Bullet: | |
| URL: | |

_Description_

Local Content List SubCategory Record

| | |
|---|---|
| Parent Folder Name: | City1.6.3 |
| Parent Folder Title: | School Listing |
| FolderName: | B6BAD84452EE4382882562920071B123 |
| Title: | Preschool & Kindergarten |
| Bullet: | |
| URL: | /search/yp2?na\us\ca\sc\la\cityyp+STDYP+KeywordListing+0+Pre-School_&_Kindergarten |

_Description_

TABLE 9

| | | | |
|---|---|---|---|
| Expire Date: | 12/04/96 | | |
| Name: | Children's Hospital | | |
| Address: | 1129 N State | | |
| City, State: | Los Angeles, CA | Zipcode: | |
| Phone: | 213-226-2622 | Fax: | |
| EMail: | | | |
| Skeleton HTML:/HTTPSKEL/STDYP.HTM | | | |
| Bullet: | | | |
| URL: | | | |
| | _Buttons_ | | |
| Button Count: | 0 | | |
| More . . . : | Image: | | |
| | _Keywords_ | | |
| SIC Code: | | | |
| Keywords: | City Government, Hospitals & Health Services | | |
| Ext. Price: | 0 | | |
| | _Description_ | | |
| Expire Date: | 12/04/96 | | |
| Name: | General Hospital | | |
| Address: | 1200 N State | | |
| City, State: | Los Angeles, CA | Zipcode: | |
| Phone: | 213-226-2622 | Fax: | |
| EMail: | | | |
| Skeleton HTML:/HTTPSKEL/STDYP.HTM | | | |
| Bullet: | | | |
| URL: | | | |
| | _Buttons_ | | |
| Button Count: | 0 | | |
| More . . . : | Image: | | |
| | _Keywords_ | | |
| SIC Code: | | | |
| Keywords: | City Government, Hospitals & Health Services | | |
| Ext. Price: | 0 | | |
| | _Description_ | | |

What is claimed is:

1. A system which associates on-line information with geographic areas, said system comprising:
   a computer network wherein a plurality of computers have access to said computer network; and
   an organizer executing in said computer network, wherein said organizer is configured to receive search requests from any one of said plurality of computers, said organizer comprising:
      a database of information organized into a hierarchy of geographical areas wherein entries corresponding to each one of said hierarchy of geographical areas is further organized into topics; and
      a search engine in communication with said database, said search engine configured to search geographically and topically, said search engine further configured to elect one of said hierarchy of geographical areas prior to selection of a topic so as to provide a geographical search area wherein within said hierarchy of geographical areas at least one of said entries associated with a border geographical area is dynamically replicated into at least o e narrower geographical area, said search engine further configure to search said topics within said selected geographical search area.

2. The system of claim 1, wherein said computer network is the internet.

3. The system of claim 1, wherein said computer network is a host-based computer system.

4. The system of claim 1, wherein said hierarchy of geographical areas define a virtual geographical environment.

5. The system of claim 1, wherein said hierarchy has a structure comprising plural geographical levels into which the geographical areas are geographically categorized by size to provide a low level, one or more intermediate levels and a high level, each of the geographical levels above the lowest level encompassing a plurality of lower level geographical areas.

6. The system of claim 5, wherein said low level is a city, said intermediate level is a territory and said high level is a state.

7. The system of claim 1, wherein said geographical search area is the world.

8. The system of claim 1, wherein said geographical search area is a continent.

9. The system of claim 1, wherein said geographical search area is a country.

10. The system of claim 1, wherein said geographical search area is a state.

11. The system of claim 1 wherein said geographical search area is a provence.

12. The system of claim 1, wherein said geographical search area is a territory.

13. The system of claim 1, wherein said geographical search area is a city.

14. The system of claim 1, wherein said geographical search area is a point of interest.

15. The system of claim 1, wherein said search engine selects one of said topics associated with said geographical search area.

16. The system of claim 1, wherein said topics are hierarchically organized.

17. The system of claim 1, wherein at least one of said entries corresponding to said geographical search area is primarily related by association with physical attributes within said geographical search area.

18. The system of claim 1, wherein said entries comprises a plurality of data records wherein each of said data records is associated with at least one of said topics and at least one of said geographical areas.

19. The system of claim 18, wherein said plurality of data records contains information about a plurality of institutions or enterprises.

20. A machine for locating information organized into geographically-based areas, said machine comprising:
a database of information accessible b a computer, said database of information organized into a predetermine hierarchy of geographical areas comprising at least a geographical area of relatively smaller expanse and a geographical area of relatively larger expanse, said area of larger expanse including a plurality of areas of smaller expanse and wherein entries corresponding to each of said hierarchy of geographical area is further organized into topics; and
a search engine executing in a computer and in communication with said database, said search engine configured to select at least one geographical area in said hierarchy of geographical areas so as to define a geographical search area wherein at least one of said entries in said geographical area of relatively larger expanse is dynamically replicated into at least one of said geographical areas of smaller expanse, said search engine further configured to search said topics within said geographical search area.

21. The machine of claim 20, wherein said hierarchy of geographical areas define a virtual geographical environment.

22. The machine of claim 20, wherein said search engine displays a list of said geographical areas when one of said requests directs said search engine to access said database.

23. The machine of claim 20, wherein at least one of said entries corresponding to said geographical search area are primarily associated with physical attributes within said geographical search area.

24. The machine of claim 20, wherein said entries comprise data records wherein each of said data records is associated with at least one of said topics.

25. The machine claim 24, wherein each of said data records contains information about a particular institution or enterprise.

26. A system for organizing on-line information into geographically-based areas, said system comprising
a user computer for accessing information in a computer network; and
organizer means for processing requests received from said user computer, said organizer comprising:
a database of information organized into a predefined hierarchy of geographical areas, wherein entries corresponding to each of said geographical areas is further organized into topics; and
search engine means for selecting one of said geographical areas wherein at least one of said entries associated with a broader geographical area is dynamically replicated into a narrower geographical area, said search engine means also comprising means for searching said topics associated with said geographical search area.

27. The system of claim 26 wherein said entries comprise data records wherein said data records are associated with said topics and wherein said data records contain information about institutions or enterprises.

28. The system of claim 26 wherein said database of information further contains a plurality of display formats, wherein each of said display formats specify a display format.

29. The system of claim 28 further comprising a display page composer means for merging said information in said data records with one of said display formats to generate a display page which is communicated to said user computer.

30. The system of claim 29 wherein said display page composer means varies the layout of said display page based on the content of said information in said data records.

31. A method for locating on line information comprising the steps of:
organizing a database of on-line information into a plurality of geographical areas, said geographical areas having a plurality of entries associated therewith;
organizing said entries corresponding to said plurality of geographical areas into one or ore topics;
directing a search engine executing in a computer to select one or more of said geographical areas so as to select a geographical search area;
dynamically replicating an entry from broader geographical area into said geographical search area; and
displaying said topics associated with sa d geographical search area.

32. The method of claim 31 wherein said geographical areas are hierarchically organized.

33. The method of claim 31 wherein said geographical search area defines a virtual geographical world.

34. The method of claim 31 further comprising the step of directing said search engine to maneuver among said topics associated with said geographical search area.

35. The method of claim 31 wherein said topics are hierarchically organized.

36. The method of claim 31 herein said entries comprise data records containing information about institutions or enterprises, wherein each of said data records is associated with at least one of said topics.

37. The method of claim 36 further comprising the step of directing said search engine to select one of said topics associated with said geographical search area.

38. The method of claim 37 further comprising the step of displaying said data records associated with said selected topic.

39. The method of claim 36 wherein at least one of said entries corresponding to said geographical search area are primarily related by association with physical attributes within said geographical search area.

\* \* \* \* \*

UNITED STATES PATENT AND TRADEMARK OFFICE
CERTIFICATE OF CORRECTION

PATENT NO.   : 5,930,474
DATED        : July 27, 1999
INVENTOR(S)  : Dunworth et al.

It is certified that error appears in the above-identified patent and that said Letters Patent is hereby corrected as shown below:

Column 38,
Line 50, delete "to elect one" and replace with -- to select one --.
Line 54, delete "a border" and replace with -- a broader --.
Line 55, delete "least o e" and replace with -- least one --.

Column 39,
Line 34, delete "comprises a" and replace with -- comprise a --.
Line 43, delete "b a computer" and replace with -- by a computer --.

Column 40,
Line 49, delete "or ore" and replace with -- or more --.
Line 55, delete "with sa d" and replace with -- with said --.

Signed and Sealed this

Ninth Day of April, 2002

Attest:

Attesting Officer

JAMES E. ROGAN
Director of the United States Patent and Trademark Office